(12) United States Patent
Willis et al.

(10) Patent No.: US 11,899,032 B2
(45) Date of Patent: Feb. 13, 2024

(54) MOLAR TRANSFER DEVICE

(71) Applicant: Leco Corporation, St. Joseph, MI (US)

(72) Inventors: Peter M. Willis, Benton Harbor, MI (US); Bradley R. Rush, St. Joseph, MI (US)

(73) Assignee: Leco Corporation, St. Joseph, MI (US)

(*) Notice: Subject to any disclaimer, the term of this patent is extended or adjusted under 35 U.S.C. 154(b) by 77 days.

(21) Appl. No.: 17/303,649

(22) Filed: Jun. 3, 2021

(65) Prior Publication Data

US 2021/0382082 A1 Dec. 9, 2021

Related U.S. Application Data

(60) Provisional application No. 62/704,933, filed on Jun. 3, 2020.

(51) Int. Cl.

| | |
|---|---|
| *G01N 35/10* | (2006.01) |
| *F16K 11/074* | (2006.01) |
| *G01N 31/12* | (2006.01) |
| *G01N 1/44* | (2006.01) |

(52) U.S. Cl.
CPC ........ *G01N 35/1097* (2013.01); *F16K 11/074* (2013.01); *G01N 31/12* (2013.01); *G01N 1/44* (2013.01)

(58) Field of Classification Search
CPC ...... G01N 35/1097; G01N 31/12; G01N 1/44; G01N 35/1095; F16K 11/074; F16K 11/085; F16K 31/041

USPC ............. 73/864.81, 23.2–31.7, 863.863, 1; 250/338.5, 343–346; 422/83–98; 356/432–440

See application file for complete search history.

(56) References Cited

U.S. PATENT DOCUMENTS

| | | |
|---|---|---|
| 6,676,387 B1 | 1/2004 | Penn |
| 2011/0008899 A1 | 1/2011 | Polemitis |
| 2013/0023057 A1 | 1/2013 | Willis |

FOREIGN PATENT DOCUMENTS

| | | | |
|---|---|---|---|
| CN | 102735304 A | * | 10/2012 |
| WO | 2004/079336 A2 | | 9/2004 |

* cited by examiner

*Primary Examiner* — Robert R Raevis
(74) *Attorney, Agent, or Firm* — Price Heneveld LLP

(57) ABSTRACT

A device is provided for use in analytical instrumentation that provides continuous transfer of a known molar quantity of gas from a source having an unknown gas mixture and varying pressure. In addition to the upstream and downstream paths of typical flow control devices, the device has a midstream path to introduce a carrier gas at a known elevated pressure. The device has at least three equal-volume ballast vessels and a valve arrangement to cycle the ballasts through at least three states: fill, equilibrate, and empty. The ballasts fill with the upstream gas, pressurize and equilibrate at the midstream pressure, and empty to the downstream path. The cycle of each ballast is timed in phased relationship to the other ballasts to keep the flow relatively uninterrupted; as one fills, another equilibrates, and another empties.

6 Claims, 23 Drawing Sheets

MOLAR TRANSFER DEVICE

CROSS-REFERENCE TO RELATED APPLICATION

This application claims priority under 35 U.S.C. § 119(e) upon U.S. Provisional Patent Application No. 62/704,933, entitled "MOLAR TRANSFER DEVICE" filed on Jun. 3, 2020, by Peter M. Willis and Bradley R. Rush, the entire disclosure of which is incorporated herein by reference.

BACKGROUND OF THE INVENTION

The present invention relates to molar transfer devices and particularly a molar transfer device for an elemental analyzer.

The determination of elements, such as carbon, hydrogen, and nitrogen, in an organic material is desirable for numerous reasons. In recent years, the food market has become interested in determining the amount of protein in a sample, which can be determined by the nitrogen content. Thus, the determination of nitrogen is important in providing useful information to the nutritional market. The carbon-to-hydrogen ratio is desirable in the characterization of coal and coke samples, as are the carbon, hydrogen, and nitrogen ratios in a variety of other organic materials. Thus, elemental analyzers have been in use for these and other applications for some time.

In present elemental analyzers, a combustion or reduction furnace may be provided for combusting or reducing a sample material such that the combustion gases produced thereby may be analyzed. One such analyzer system is described in U.S. Pat. No. 7,070,738, assigned to the present assignee, the disclosure of which is incorporated herein by reference. U.S. Pat. Nos. 7,497,991; 4,622,009; 6,291,802; and 6,270,727 also disclose components of a combustion system. The disclosures of the '991, '009, '802, and '727 patents are also incorporated herein by reference.

Some elemental analyzers have a carrier gas that sweeps through their combustion or reduction furnace carrying with it the gases that are evolving from the sample material at unknown rates. In other locations along the flow path, selected gases are removed or converted. It is often necessary or desirable to control the flow rates in regions downstream of such events where the relative concentrations of the gas constituents are unknown and varying. Variations in gas composition cause problems for traditional flow controllers, which rely on at least one gas property being constant such as viscosity or thermal conductivity. These properties change as the gas mixture changes thereby affecting the flow rate.

U.S. Pat. No. 4,525,328 describes an analyzer that foregoes an attempt to control the flow rate, but rather collects the combustion gases from a sample burn in a large ballast vessel. The minimal oxygen flow rate required to support combustion and the longest sample combustion time determine the ballast's size requirement. For samples requiring a shorter combustion time, the burn is completed long before the ballast is filled. The remainder of the ballast is filled with expensive high purity oxygen carrier gas, which dilutes the analysis gases, worsening the detection limits. After filling, the vessel equilibrates and an aliquot is taken from its contents for further analysis downstream. The ballast is then emptied and purged. The analysis time can be two to four times longer than the burn time for some samples. This method provides a repeatable result, but suffers in terms of sensitivity, cost, and speed.

U.S. Pat. No. 9,435,758 discloses a bidirectional ballast system that extends the ballast idea by cyclically filling one side of a smaller ballast volume while emptying the other side. This approach reduces gas consumption, dilution, and analysis time but it does not allow the gases to mix thoroughly before emptying, and the ballast pressure varies due to the upstream combustion event leading to poor precision.

Various pumps have been used in an attempt to transfer combustion gases at constant rates. However, variations in gas mixture and resulting changes in gas viscosity cause the pressure drop in the pump inlet to vary. Because of this and pressure variations, the pumps transfer gas at varying rates during analysis.

SUMMARY OF THE INVENTION

The disclosed invention overcomes the above limitations of transferring a known molar quantity of gas where the upstream source has an unknown mixture of gases at varying pressure. The device has three gas connections: upstream, downstream, and midstream. The midstream path introduces a carrier gas at an elevated pressure as compared to the upstream pressure. The device has at least three fillable ballasts and a valve arrangement to direct the three gas streams to the ballasts in a cyclical manner. A means is also provided to either measure or control the device temperature.

Each ballast cycles through at least three states: fill, equilibrate, and empty. The ballasts are cycled in phased relation to one another so that the upstream and downstream flows are relatively uninterrupted. In the fill state, gas from the upstream path fills the ballast. In the equilibrate state, the carrier gas pressurizes the ballast to a reproducible level while gases mix in the ballast. In the final state the contents of the ballast are emptied to the downstream path.

The Ideal Gas Law indicates that the number of moles transferred per cycle of the device is known regardless of the gas mixture, if the pressure, temperature, and volume are known.

According to one aspect of the present invention, a molar transfer device is provided comprising: a ballast mechanism comprising: a first ballast cylinder, a passive piston provided in the first ballast cylinder that divides the first ballast cylinder into a first ballast and a second ballast, a first ballast port for allowing gas to flow into and out of the first ballast, and a second ballast port for allowing gas to flow into and out of the second ballast. The molar transfer device further comprising: a valve device comprising: a valve body including an upstream gas port, a midstream gas port, and a downstream gas port, and a valve contained in the valve body coupled to the first ballast port and the second ballast port for sequentially: (a) directing gas from the upstream gas port into the first ballast while emptying the second ballast into the downstream gas port, (b) coupling the first ballast port to the midstream gas port to equilibrate the gas in the first ballast, (c) directing gas from the upstream gas port into the second ballast while emptying the first ballast into the downstream gas port, and (d) coupling the second ballast port to the midstream gas port to equilibrate the gas in the second ballast.

According to another aspect of the present invention, a molar transfer device is provided comprising a ballast mechanism and a rotary valve. The ballast mechanism comprising: a first ballast cylinder, a passive piston provided in the first ballast cylinder that divides the first ballast cylinder into a first ballast and a second ballast, a first ballast port for allowing gas to flow into and out of the first ballast, and a second ballast port for allowing gas to flow into and out of the second ballast. The rotary valve comprising: a valve body having a cylindrical bore in communication with an upstream gas port, a midstream gas port, and a downstream gas port, a rotating cylindrical chamber positioned in the cylindrical bore so as to rotate therein, the rotating cylindrical chamber having a first axial port, a second axial port, a third axial port, a first radial port in communication with the first axial port, a second radial port in communication with the second axial port, and a third radial port in communication with the third axial port, an outer cylindrical wall of the rotating chamber being spaced from the inner wall of the cylindrical bore to allow the first radial port, the second radial port, and the third radial port to be in communication with the upstream gas port, the midstream gas port, and the downstream gas port, respectively, regardless of the rotated position of the rotating cylindrical chamber, a first valve end cap including a first cap port connected to the first ballast port and extending internally to align with one of the first axial port, the second axial port, and the third axial port depending on the rotational position of the rotating cylindrical chamber, and a second cap port connected to the second ballast port and extending internally to align with another one of the first axial port, the second axial port, and the third axial port depending on the rotational position of the rotating cylindrical chamber, and a motor for rotating the rotating cylindrical chamber to different rotational positions in order to alter which of the first axial port, the second axial port, and the third axial port is aligned with the first cap port and the second cap port such that each of the first and second ballasts is sequentially filled with gas from the upstream gas stream, equilibrated with the midstream gas stream, and emptied into the downstream gas stream, wherein as the first ballast is filled, the second ballast is emptied and as the second ballast is filled, the first ballast is emptied.

According to another aspect of the present invention, a molar transfer device is provided comprising a ballast mechanism comprising: a first ballast cylinder, a passive piston provided in the first ballast cylinder that divides the first ballast cylinder into a first ballast and a second ballast, a first ballast port for allowing gas to flow into and out of the first ballast, and a second ballast port for allowing gas to flow into and out of the second ballast. The molar transfer device further comprises a rotary valve comprising: a valve body having a cylindrical bore; a rotating cylindrical chamber positioned in the cylindrical bore so as to rotate therein, the rotating cylindrical chamber having a first port, a second port, a third port, a fourth port in communication with the first port, a fifth port in communication with the second port, and a sixth port in communication with the third port, the rotating cylindrical chamber having a first end and a second end at the opposite end of the cylinder, the first, second and third ports opening at the first end and the fourth, fifth and sixth ports opening at the second end, the second end having a first annular groove in communication with the fourth port and one of an upstream gas port, a midstream gas port, and a downstream gas port regardless of the rotated position of the rotating cylindrical chamber, the second end further comprising a second annular groove in communication with the fifth port and another one of the upstream gas port, the midstream gas port, and the downstream gas port regardless of the rotated position of the rotating cylindrical chamber, the sixth port opens in a center of the second end and is in communication with yet another one of the upstream gas port, the midstream gas port, and the downstream gas port; a first valve end cap including a first cap port extending internally to align with one of the first port, the second port, and the third port depending on the rotational position of the rotating cylindrical chamber, and a second cap port extending internally to align with another one of the first port, the second port, and the third port depending on the rotational position of the rotating cylindrical chamber; and a motor for rotating the rotating cylindrical chamber to different rotational positions in order to alter which of the first port, the second port, and the third port is aligned with the first cap port and the second cap port such that each of the first cap port and the second cap port is sequentially connected to the upstream gas port, the midstream gas port, and the downstream gas port.

According to another aspect of the present invention, a ballast mechanism comprises: a first ballast cylinder; a passive piston provided in the first ballast cylinder that divides the first ballast cylinder into a first ballast and a second ballast; a first ballast port for allowing gas to flow into and out of the first ballast; a second ballast port for allowing gas to flow into and out of the second ballast; a second ballast cylinder; a second passive piston provided in the second ballast cylinder that divides the second ballast cylinder into a third ballast and a fourth ballast; a third ballast port for allowing gas to flow into and out of the second ballast; and a fourth ballast port for allowing gas to flow into and out of the fourth ballast.

According to another aspect of the present invention, a rotary valve is provided comprising: a valve body having a cylindrical bore in communication with an upstream gas port, a midstream gas port, and a downstream gas port; a rotating cylindrical chamber positioned in the cylindrical bore so as to rotate therein, the rotating cylindrical chamber having a first axial port, a second axial port, a third axial port, a first radial port in communication with the first axial port, a second radial port in communication with the second axial port, and a third radial port in communication with the third axial port, an outer cylindrical wall of the rotating chamber being spaced from the inner wall of the cylindrical bore to allow the first radial port, the second radial port, and the third radial port to be in communication with the upstream gas port, the midstream gas port, and the downstream gas port, respectively, regardless of the rotated position of the rotating cylindrical chamber; a first valve end cap including a first cap port extending internally to align with one of the first axial port, the second axial port, and the third axial port depending on the rotational position of the rotating cylindrical chamber, and a second cap port extending internally to align with another one of the first axial port, the second axial port, and the third axial port depending on the rotational position of the rotating cylindrical chamber; and a motor for rotating the rotating cylindrical chamber to different rotational positions in order to alter which of the first axial port, the second axial port, and the third axial port is aligned with the first cap port and the second cap port such that each of the first cap port and the second cap port is sequentially connected to the upstream gas port, the midstream gas port, and the downstream gas port.

According to another aspect of the present invention, a rotary valve is provided comprising: a valve body having a cylindrical bore; a rotating cylindrical chamber positioned in the cylindrical bore so as to rotate therein, the rotating cylindrical chamber having a first port, a second port, a third port, a fourth port in communication with the first port, a fifth port in communication with the second port, and a sixth port in communication with the third port, the rotating cylindrical chamber having a first end and a second end at the opposite end of the cylinder, the first, second and third ports opening at the first end and the fourth, fifth and sixth ports opening at the second end, the second end having a first annular groove in communication with the fourth port and one of an upstream gas port, a midstream gas port, and a downstream gas port regardless of the rotated position of the rotating cylindrical chamber, the second end further comprising a second annular groove in communication with the fifth port and another one of the upstream gas port, the midstream gas port, and the downstream gas port regardless of the rotated position of the rotating cylindrical chamber, the sixth port opens in a center of the second end and is in communication with yet another one of the upstream gas port, the midstream gas port, and the downstream gas port; a first valve end cap including a first cap port extending internally to align with one of the first port, the second port, and the third port depending on the rotational position of the rotating cylindrical chamber, and a second cap port extending internally to align with another one of the first port, the second port, and the third port depending on the rotational position of the rotating cylindrical chamber; and a motor for rotating the rotating cylindrical chamber to different rotational positions in order to alter which of the first port, the second port, and the third port is aligned with the first cap port and the second cap port such that each of the first cap port and the second cap port is sequentially connected to the upstream gas port, the midstream gas port, and the downstream gas port.

These and other features, objects and advantages of the present invention will become apparent upon reading the following description thereof together with reference to the accompanying drawings.

DETAILED DESCRIPTION OF THE EMBODIMENTS

Figure 1:
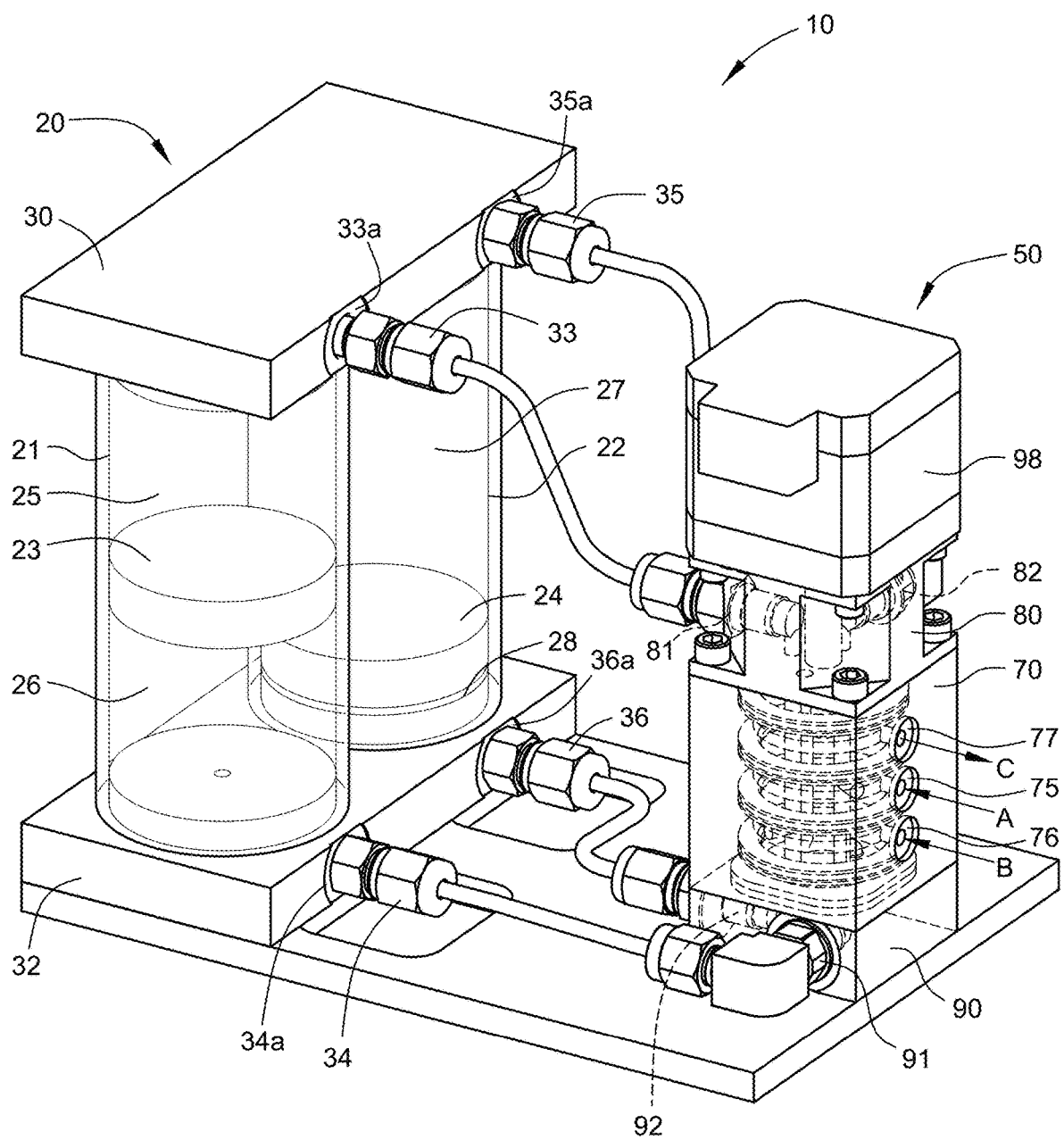
FIG. 1 is a perspective view of a molar transfer device.
Figure 8:
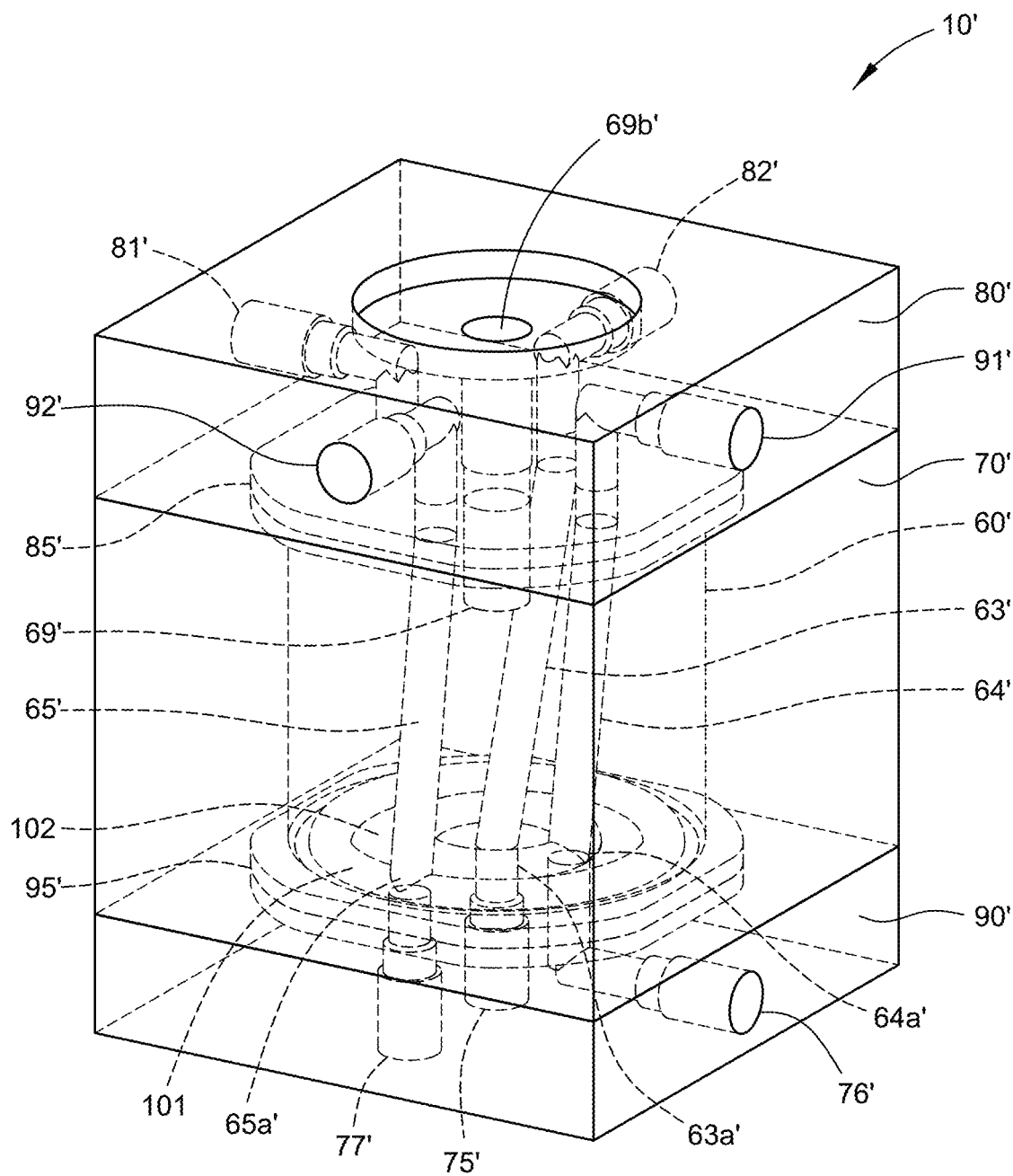
FIG. 8 is a perspective view of an alternative rotary valve that may be used in the molar transfer device shown in FIG. 1.
Figure 9:
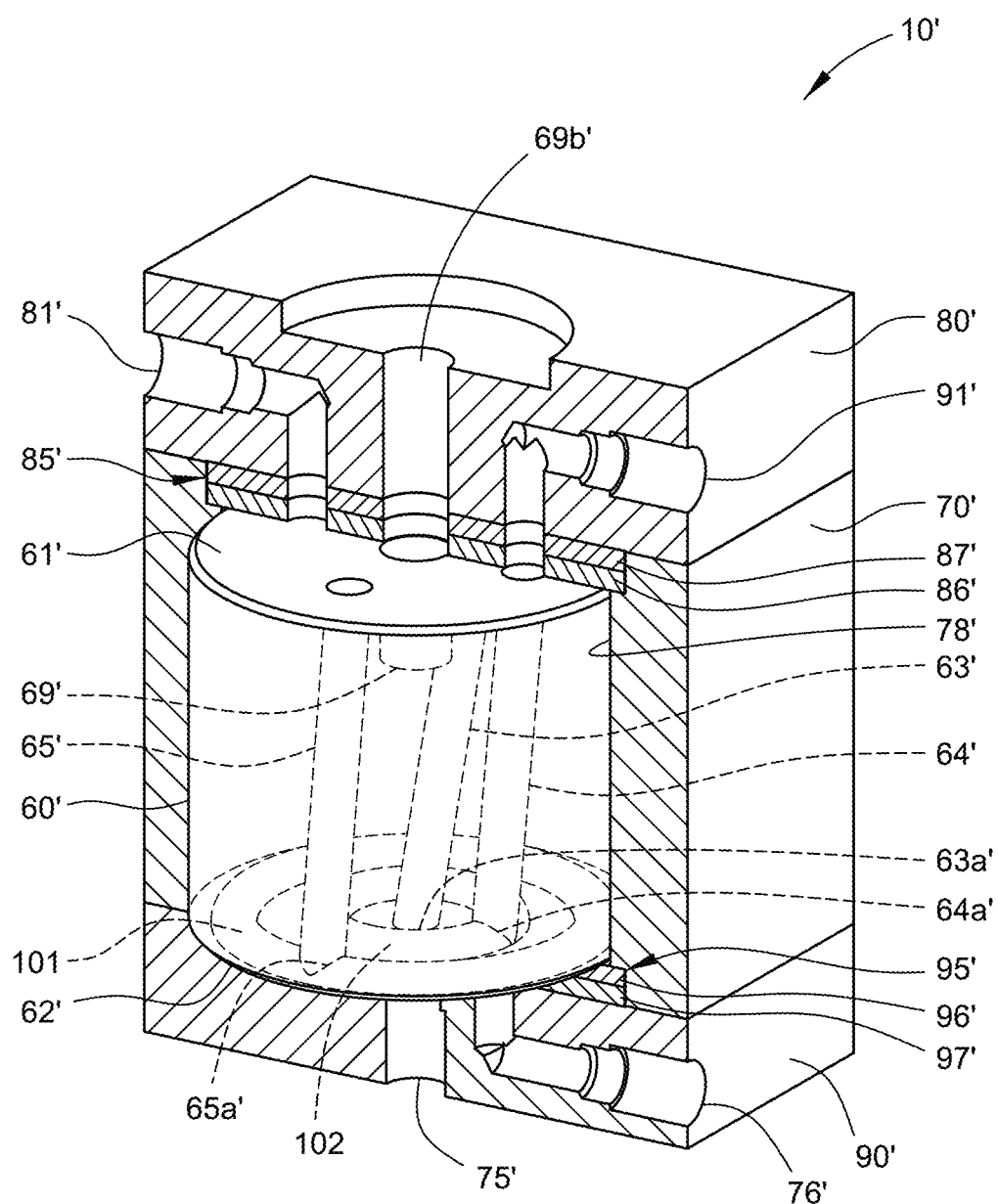
FIG. 9 is a partial cross-sectional perspective view of the rotary valve shown in FIG. 8.
Figure 10:
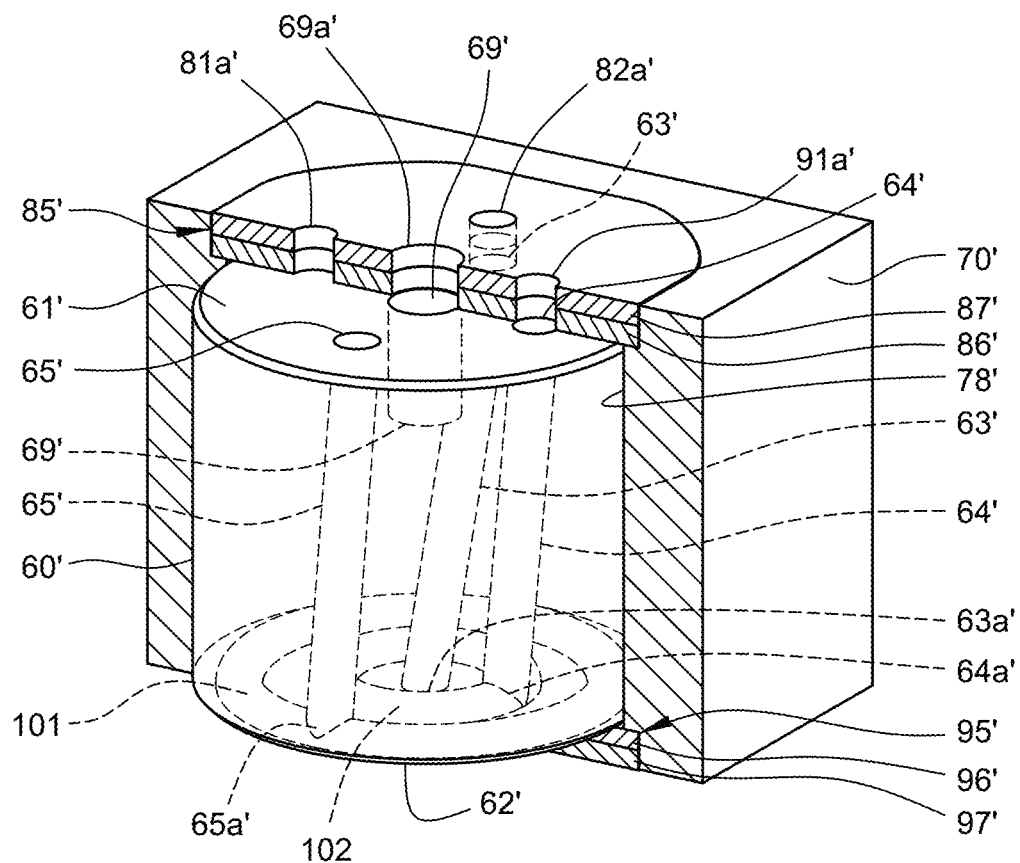
FIG. 10 is a partial cross-sectional perspective view of the rotary valve shown in FIG. 8.
Figure 11:
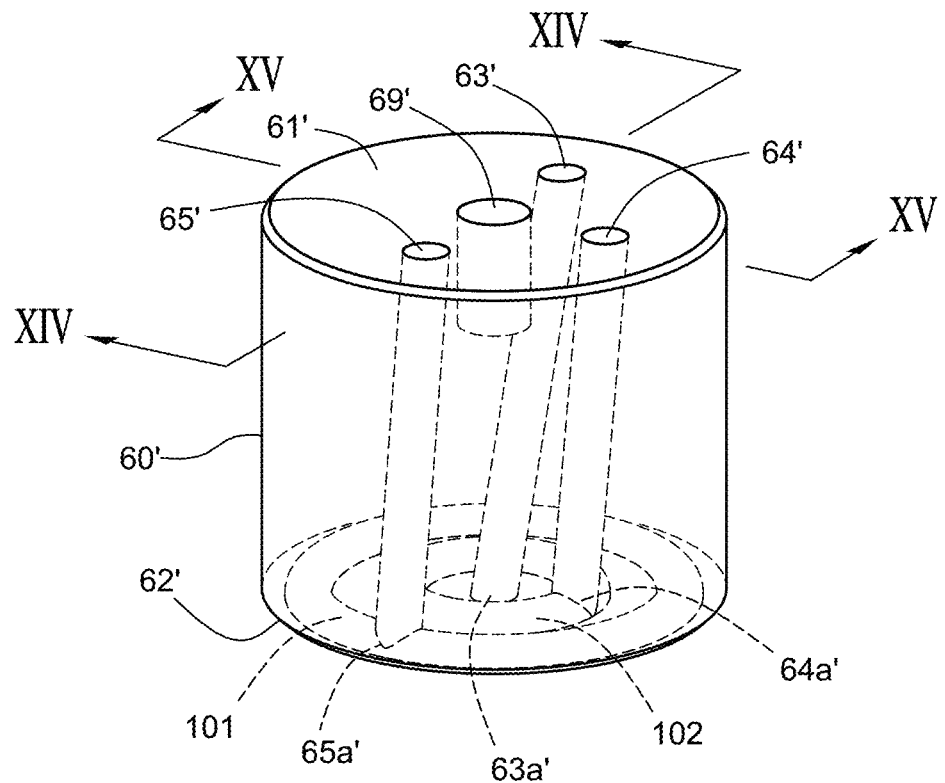
FIG. 11 is a perspective view of a rotating cylindrical chamber used in the rotary valve shown in FIG. 8.
Figure 12:
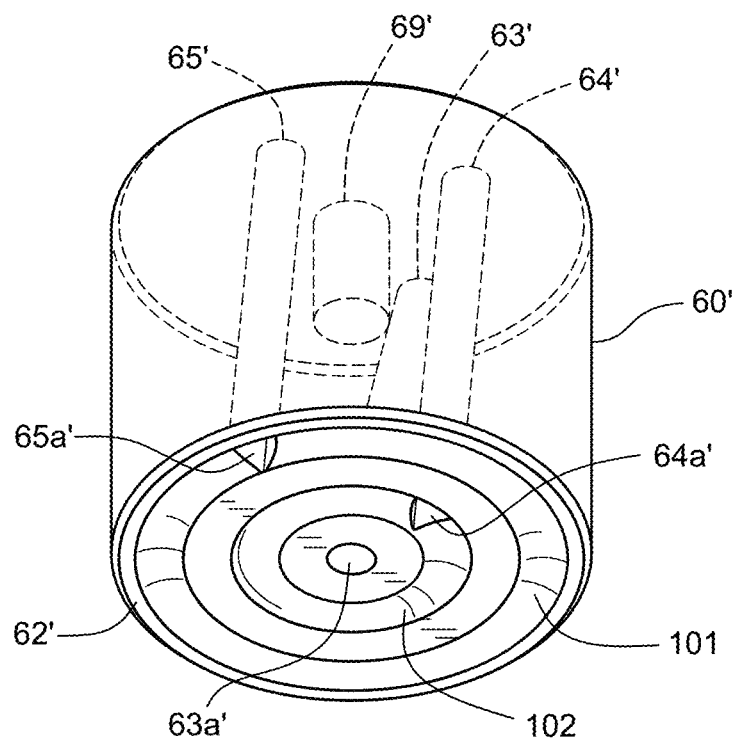
FIG. 12 is a perspective view of the rotating cylindrical chamber shown in FIG. 11.
Figure 13:
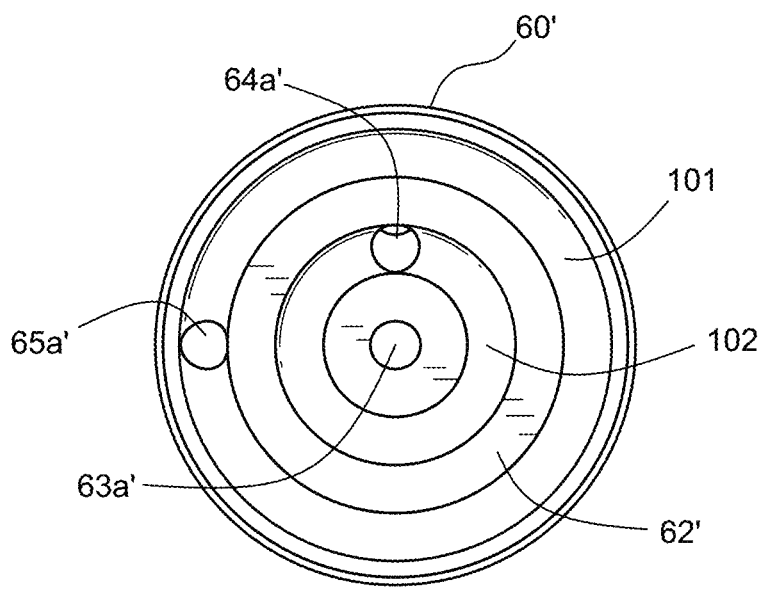
FIG. 13 is a bottom plan view of the rotating cylindrical chamber shown in FIG. 11.
Figure 14:
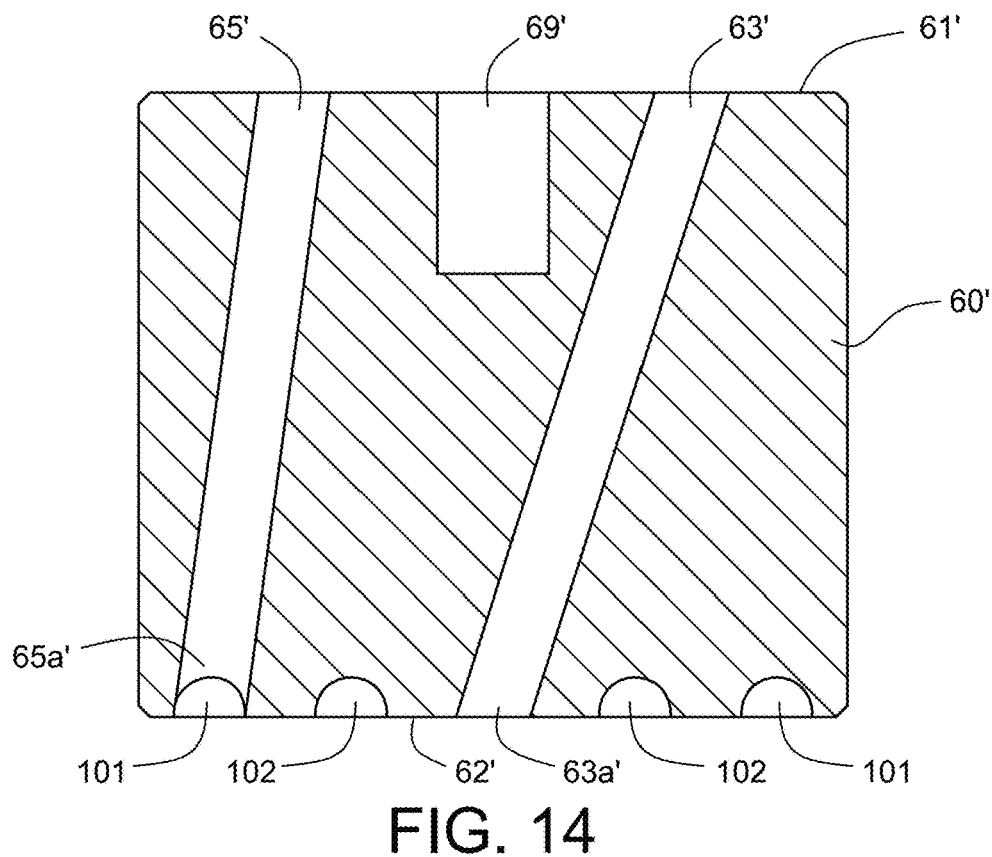
FIG. 14 is a cross-sectional view of the rotating cylindrical chamber shown in FIG. 11 taken along line XIV-XIV.
Figure 15:
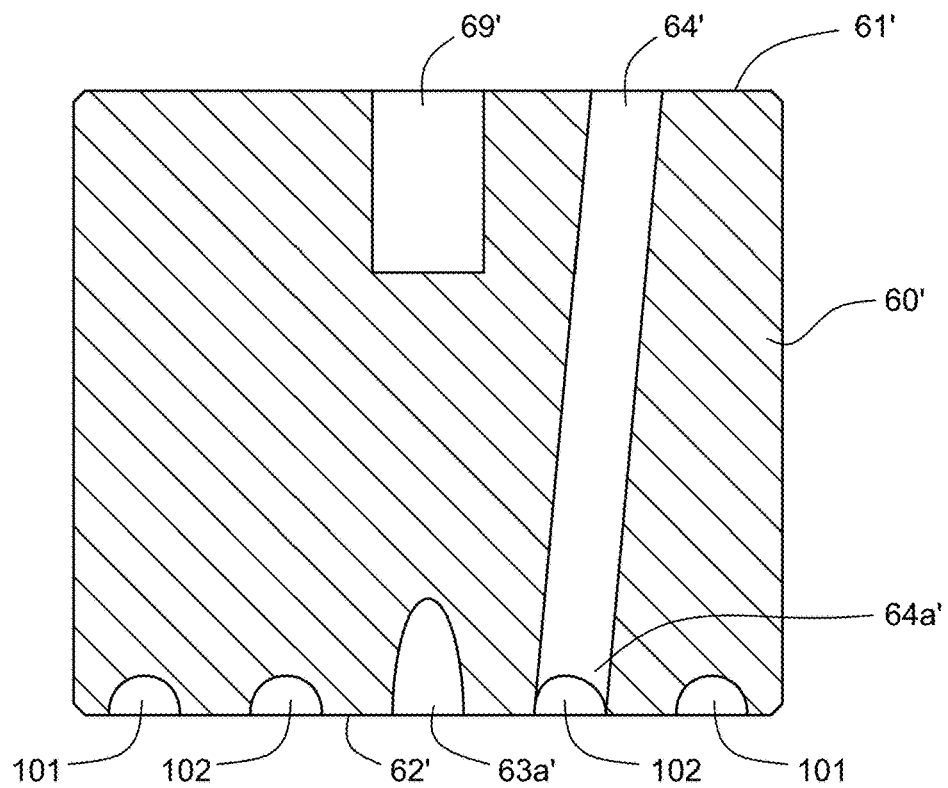
FIG. 15 is a cross-sectional view of the rotating cylindrical chamber shown in FIG. 11 taken along line XV-XV.

Referring initially to FIG. 1, there is shown a molar transfer device 10. In one embodiment, the molar transfer device 10 is used in an elemental combustion analyzer 200 (FIG. 8) with an oxygen carrier gas. The molar transfer device 10 has a ballast mechanism 20 with at least a first ballast cylinder 21 with a movable piston 23. The piston 23 divides the first ballast cylinder 21 into individual ballasts thereby providing a first ballast 25 and a second ballast 26. A second ballast cylinder 22 may be provided having a movable piston 24 that divides the second ballast cylinder 22 into a third ballast 27 and a fourth ballast 28. The first and second ballast cylinders 21 and 22 may be of equal volume.

The molar transfer device 10 is connected to three gas streams: an upstream gas stream A, a midstream gas stream B, and a downstream gas stream C. A rotary valve 50 is used to connect the three streams A, B, and C to the four ballasts 25, 26, 27, and 28 in a cyclical manner. The molar transfer device 10 may be situated in a constant temperature oven so that the molar quantity of gas transferred per cycle of the device is constant.

Description of the Ballasts

Figure 2:
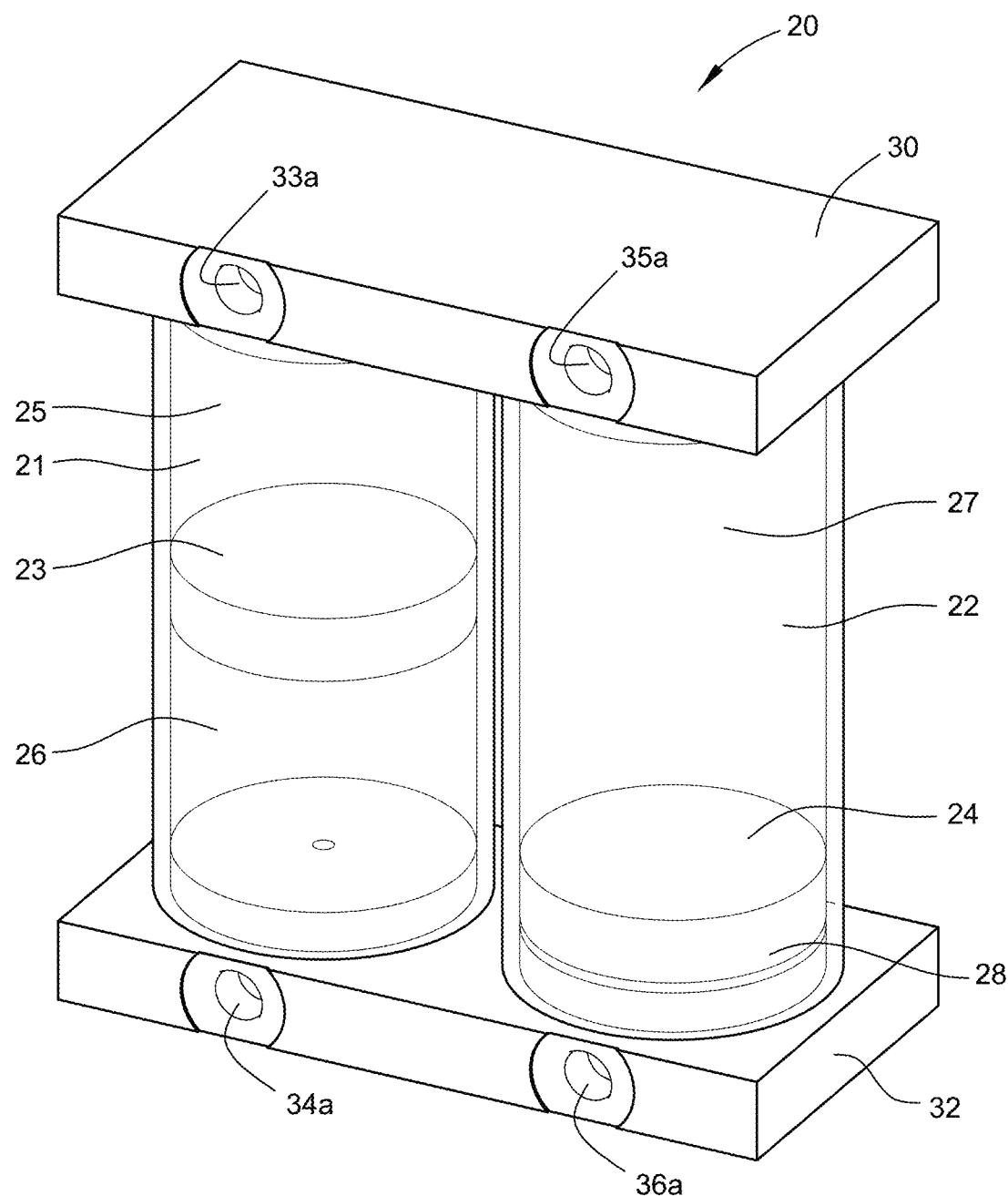
FIG. 2 is a perspective view of a ballast mechanism used in the molar transfer device shown in FIG. 1.

As shown in FIGS. 1 and 2, the ballast mechanism 20 includes a first ballast end cap 30 and a second ballast end cap 32 with internal nozzles to disperse the gas entering the volume. A first ballast port 33a allows gas to flow into and out of the first ballast 25, a second ballast port 34a allows gas to flow into and out of the second ballast 26, a third ballast port 35a allows gas to flow into and out of the third ballast 27, and a fourth ballast port 36a allows gas to flow into and out of the fourth ballast 28. The first and third ballast ports 33a and 35a connect the nozzles to the exterior of the first ballast end cap 30 where connectors 33 and 35 may be provided to connect to the rotary valve 50. Similarly, the second and fourth ballast ports 34a and 36a connect the nozzles to the exterior of the second ballast end cap 30 where connectors 34 and 36 may be provided to connect to the rotary valve 50.

The piston speed is controlled by the pressure differential between the upstream and downstream paths. When a piston 23, 24 is moving in a cylinder 21, 22, the ballast 25, 27 on one side is filling while the ballast 26, 28 on other side is emptying. The upstream pressure is held relatively constant, but this pressure is expected to fluctuate somewhat due to the combustion event. The midstream carrier pressure is precisely maintained at a level above the maximum expected upstream pressure so that its pressure always determines the equilibrated pressure of the ballast. There is an adjustable restriction such as a proportional valve in the downstream path to control the piston speed and thereby the desired fill rate of the molar transfer device 10. The valve timing is determined so the desired molar quantity of gas is transferred per unit time. The rotary valve 50 is intended to cycle just after a piston 23, 24 reaches its end of travel. Since the upstream pressure fluctuates during combustion, the piston 23, 24 may not reach the end of travel before the valve 50 is cycled. A means is provided in the valving to allow the piston 23, 24 to complete its travel during the equilibrate state without affecting the molar transfer rate of the device 10.

The ballasts 25, 26, 27, and 28 cycle through four states: fill, equilibrate, empty, and wait. The rotary valve 50 sequences the ballasts 25, 26, 27, and 28 in phased relationship to each other so that there is always one filling, one equilibrating, one emptying, and one waiting.

The ballast size is determined by the oxygen flow rate required to sustain combustion, and the time to thoroughly mix the gases. One analyzer requires an oxygen flow rate of 5 lpm, and the gases are considered mixed after 5 seconds. The shortest burn for this analyzer is about 10 seconds, so the volume is filled with about half its combustion gases at the peak of the burn, avoiding over-dilution. The resulting ballast volume is approximately 0.4 liters.

$$5 \; lpm * \frac{5 \; sec}{60} = 0.417 \; liters$$

When one large ballast (e.g., 4.5 liters) is used to collect all of the products of a longer lasting combustion event, the ballast may be larger than needed when a combustion event is shorter, which will then result in dilution of the collected gases by the carrier gas (typically high purity oxygen). By replacing the single large ballast with smaller ballasts (e.g., 200 to 400 ml), dilution can be prevented, and the amount of expensive oxygen can be reduced.

The pistons 23 and 24 may be constructed of a low friction material so that no seals or grease may be needed on the pistons. This reduces maintenance costs.

Description of the Rotary Valve

Figure 3:
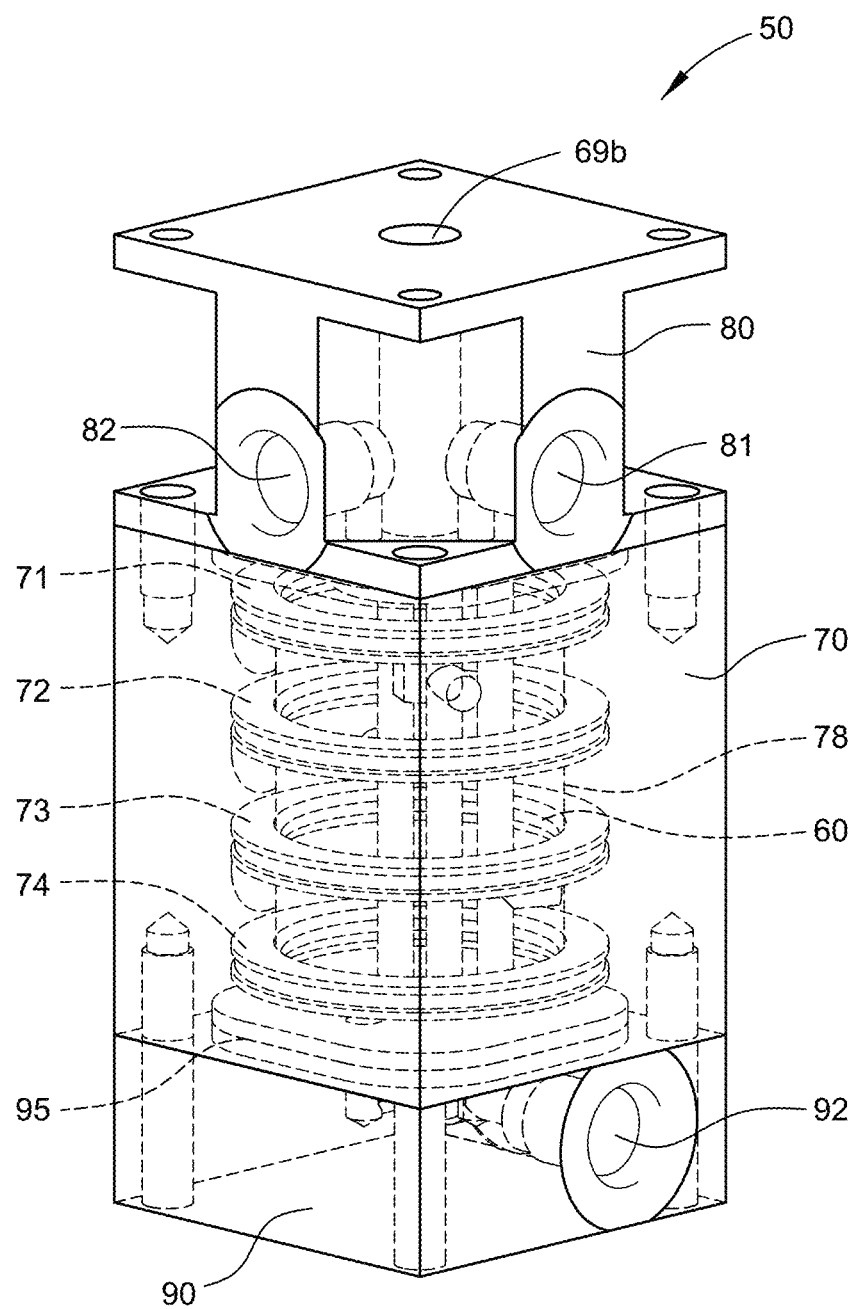
FIG. 3 is a perspective view of a rotary valve used in the molar transfer device shown in FIG. 1.
Figure 5:
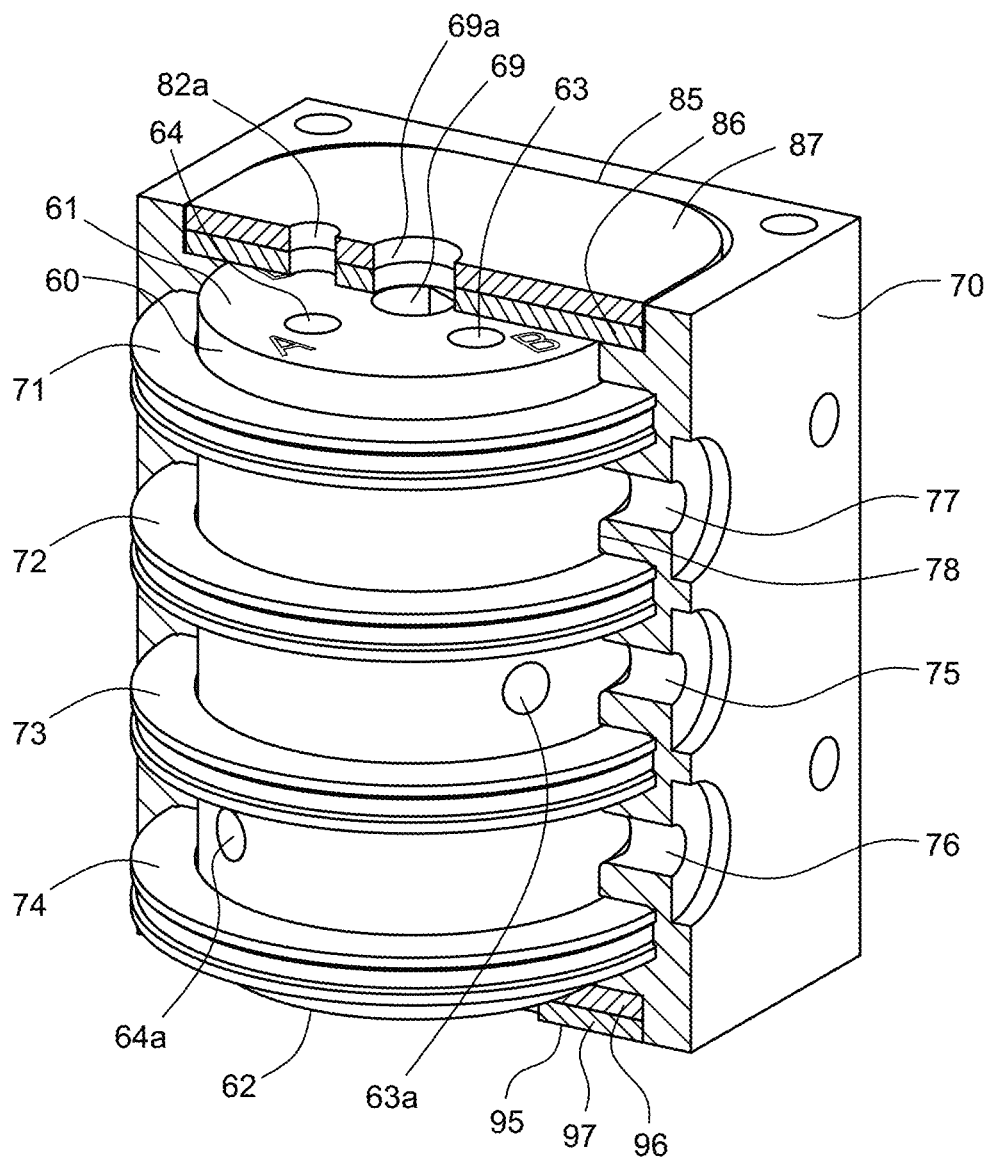
FIG. 5 is a partial cross-sectional perspective view of the rotary valve shown in FIG. 3.

The rotary valve 50 is used to direct gas between the three streams A, B, and C and the four ballasts 25, 26, 27, and 28 in a cyclical manner. As shown in FIGS. 1, 3, and 5, the rotary valve 50 is comprised of a rotating cylindrical chamber 60, a valve body 70, a first valve end cap 80, a second valve end cap 90, a first end seal 85, a second end seal 95, rotary seals 71, 72, 73, 74, and a motor 98.

Figure 4:
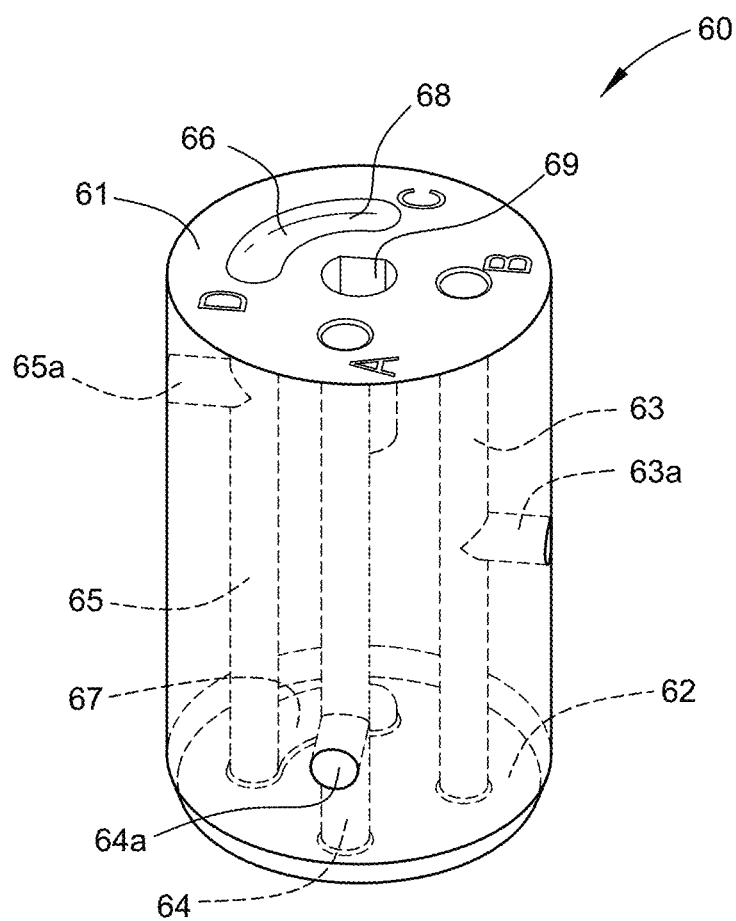
FIG. 4 is a perspective view of a rotating cylindrical chamber used in the rotary valve shown in FIG. 3.

As shown in FIG. 4, the rotating cylindrical chamber 60 has flat end faces 61 and 62 with three internal axial ports 63, 64, and 65 that extend axially the length of the chamber 60 to open at both chamber faces 61 and 62. The axial ports 63, 64, and 65 are located at a fixed radius from the center of the faces 61 and 62, and are arranged at 90° from each other. A channel 66, 67 on each cylinder face 61 and 62 extends the third axial port 65 to the fourth 90° position 68. This feature allows a piston 23 and 24 to complete its travel during the equilibration state if necessary. There is a non-circular feature 69 in the center of one cylinder face 61 designed to engage a similarly shaped mating coupling on a shaft of the motor 98.

As shown in FIGS. 4 and 5, three radial ports 63a, 64a, and 65a in the chamber's side wall intersect the three axial ports 63, 64, and 65, respectively. The radial ports 63a, 64a, and 65a are located in spaced relation along the length of the cylindrical chamber 60 and align with similarly spaced ports 75, 76, and 77 on the valve body 70 connecting to the three gas paths A, B, and C, respectively. The arrangement allows gas entering the radial port 63a or 64a to flow to either chamber end face 61, 62 and for gas exiting the radial port 65a to flow from either chamber end face 61, 62.

The valve body 70 has a large cylindrical bore 78 to receive the rotating chamber 60. Three radial ports 75, 76, and 77 in the valve body 70 align with the three radial ports 63a, 64a, and 65a on the chamber 60 and have a means to connect to the three gas streams A, B, C. There are four rotary seals 71, 72, 73, 74 located along the length of the bore 78 to seal the three radial ports 63a, 64a, and 65a from each other and from the outside environment. These rotary seals 71, 72, 73, 74 also center the chamber 60 inside the bore 78. The bore 78 is designed to allow the three gas steams to easily flow between the inside of the valve body 70 and the rotating chamber 60. In this way, regardless of the rotational position of chamber 60, upstream gas may flow from the first radial port 75 of the valve body 70 to the first radial port 63a and hence the first axial port 63 of the chamber 60, midstream gas may flow from the second radial port 76 of the valve body 70 to the second radial port 64a and hence the second axial port 64 of the chamber 60, and downstream gas may flow from the third axial port 65 to the third radial port 65a and to the third radial port 77 of the valve body 70.

The rotating cylindrical chamber 60 is axially retained by the first valve end cap 80 and the second valve end cap 90 both fastened to the valve body 70. As shown in FIGS. 1 and 3, the first valve end cap 80 has a first cap port 81 and a second cap port 82 at locations that will interconnect with any one of the axial ports 63, 64, and 65 of the rotating chamber 60. Similarly, the second valve end cap 90 has a third cap port 91 and a fourth cap port 92 at locations that will interconnect with any one of the axial ports 63, 64, and 65 of the rotating chamber 60. The cap ports 81, 82, 91, 92 are located 90° from each other, and the cap ports 81 and 82 on the first valve end cap 80 occupy positions that are 180° from cap ports 91 and 92 on the second valve end cap 90. In this manner, the axial ports 63 and 64 can only align with one cap port 81, 82, 91, 92 at a time. The cap ports 81, 82, 91, 92 extend to an exterior of the caps 80 and 90 where connectors 33, 34, 35, and 36 are provided to connect the four cap ports 81, 82, 91, 92 to the four ballasts 25, 26, 27, and 28. Specifically, as shown in FIG. 1, the first cap port 81 is connected by a first connector 33 to the first ballast port 33a and hence the first ballast 25. The third cap port 91 is connected by a second connector 34 to the second ballast port 34a and hence the second ballast 26. The second cap port 82 is connected by a third connector 35 to the third ballast port 35a and hence the third ballast 27. The fourth cap port 92 is connected by a fourth connector 36 to the fourth ballast port 36a and hence the fourth ballast 28.

The motor 98 is secured to one of the valve end caps 80, 90. As shown in FIGS. 3-5, there is a hole 69b (FIG. 3) in the first valve end cap 80 that aligns with a hole 69a in the first end seal 85 (FIG. 5) for the motor shaft to pass through and engage the non-circular port 69 in the center of the rotating chamber 60 (FIGS. 4 and 5).

Figure 6:
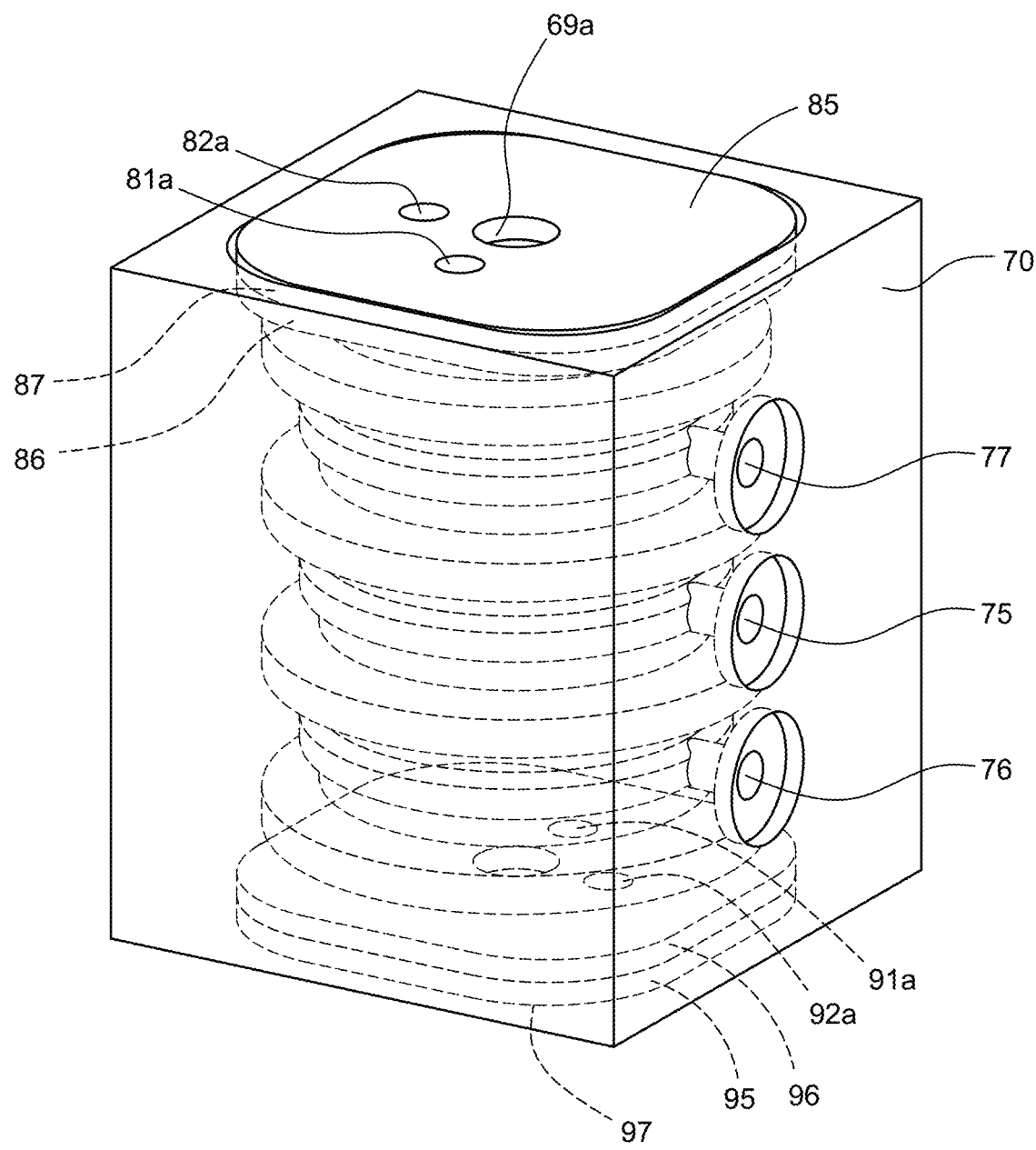
FIG. 6 is a perspective view of a valve body used in the rotary valve shown in FIG. 3.

As shown in FIG. 5 the first and second end seals 85 and 95 between the first and second valve end caps 80 and 90 and the rotating chamber end faces 61 and 62 are preferably composed of two materials: an elastomer material 87 and 97 that is in contact with the valve end cap 80 and 90; and a low friction-material 86 and 96 such as PTFE that is in contact with the rotational chamber end face 61 and 62. The elastomer material 87 and 97 provides a spring force to keep the low-friction material 86 and 96 sealing against the chamber end face 61 and 62. The end seals 85 and 95 are retained between the valve end cap 80 and 90 and the valve body 70 so that they do not rotate with the chamber 60. Openings 81a, 82a, 91a, 92a (FIG. 6) in the end seals 85 and 95 match each cap port 81, 82, 91, 92, respectively.

Although the four cap ports 81, 82, 91, and 92 are disclosed above as being divided between the first and second valve end caps 80 and 90, the cap ports can all be located on the same valve end cap 80 or 90. Further, although the four cap ports 81, 82, 91, and 92 are described and shown as exiting different sides of the valve end caps 80 and 90, the cap ports can all exit on one side. Such modifications may allow for the use manifolds to connect the various components. Some or all of the connectors 33, 34, 35, and 36 may be provided as ports through a common substrate used to form the end caps of ballast and rotary valve to eliminate possible leakage points.

In addition, although the three radial ports 75, 76, and 77 are shown on the same side, they can be on different sides of the valve body 70.

Although the rotary valve 50 is described and shown in combination with the particular ballast mechanism 20, the rotary valve 50 is of novel construction and may be used with any other ballast mechanism.

To accomplish the functions of the rotary valve 50 as described herein, either 12 two-way valves, 4 three-way valves, or a complex stem valve would be required that can result in undesirable dead volume (carry over from last sample, scaling of current sample). The rotary valve 50 provides no dead volume and thus no carry over from the last sample analyzed. The rotary valve 50 provides several advantages over the prior art in that it eliminates pinch tubes and stem valves, which require maintenance.

Although the rotary valve 50 is shown as having redirecting flow to or from three gas streams to four ballasts, a rotary valve may be constructed to connect to any number N of gas streams by using N axial ports and may connect to any number M of ballasts or other devices by including M cap ports.

Operation

FIGS. 7A-7H show a schematic view of the molar transfer device 10 in its various operational states. In the schematic, the rotary valve 50 is shown on its side with all four cap ports 81, 82, 91, and 92 shown on one end to facilitate the description of the operation.

Figure 7A:
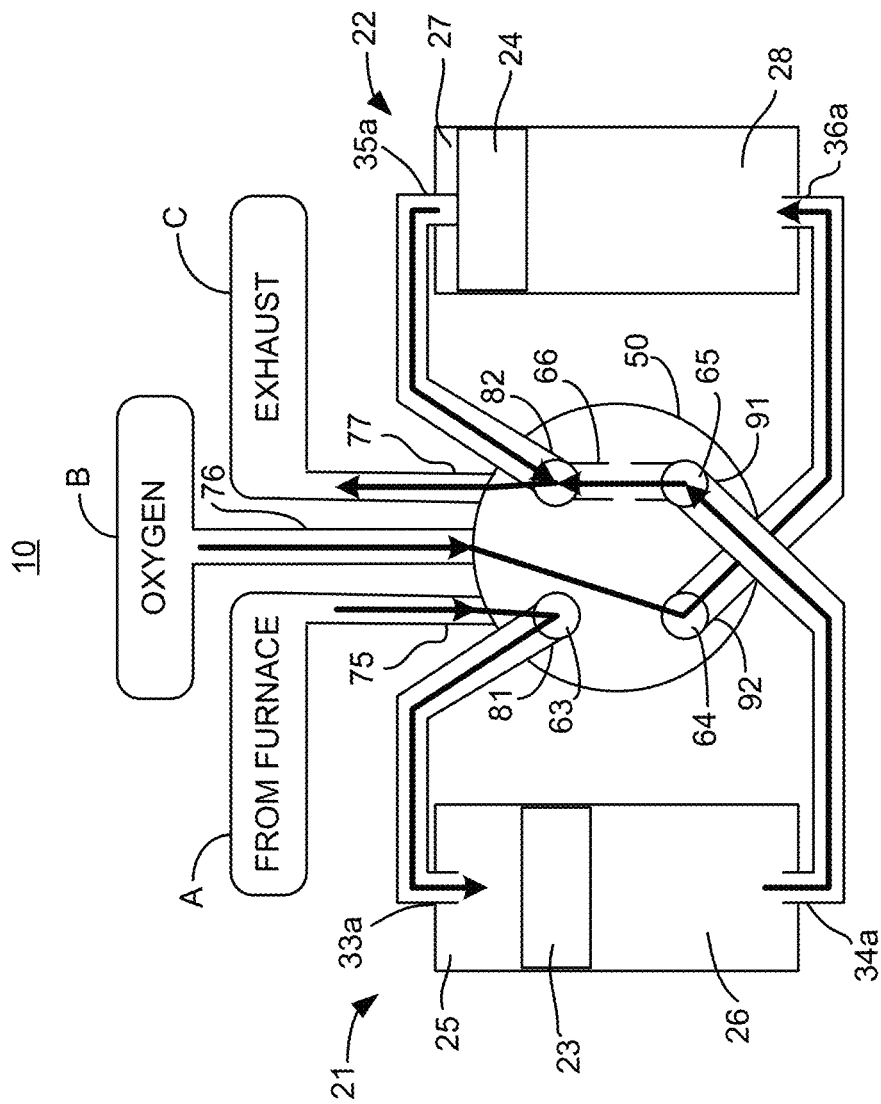
FIGS. 7A-7H are schematic views of the molar transfer device shown in FIG. 1 in a sequence of operational cycles.

FIG. 7A shows a first state in which the first axial port 63 is aligned with the first cap port 81 such that the upstream gas stream A from the furnace is directed into the first ballast 25 via the first radial port 75 of the valve body, the first axial port 63, the first cap port 81, and the first ballast port 33a. The second axial port 64 is aligned with the fourth cap port 92 such that the midstream gas B (such as oxygen) is directed into the fourth ballast 28 via the second radial port 76 of the valve body 70, the second axial port 64, the fourth cap port 92, and the fourth ballast port 36a. The third axial port 65 is aligned with the third cap port 91 such that gas is emptied from the second ballast 26 into the downstream gas stream (or exhaust) via the second ballast port 34a, the third cap port 91, the third axial port 65, and the third radial port 77 of the valve body 70. The pressure from the upstream gas filling the first ballast 25 presses the piston 23, which in turn pushes the gas from the second ballast 26. The second cap port 82 is aligned with the channel 66 such that gas is emptied from the third ballast 27 into the downstream gas stream (or exhaust) via third ballast port 35a, the second cap port 82, the channel 66, the third axial port 65, and the third radial port 77 of the valve body 70. The pressure from the midstream gas filling the fourth ballast 28 presses the piston 24, which in turn pushes the gas from the third ballast 27. Thus, in this first state, the first ballast 25 is being filled with upstream gas A while the second and third ballasts 26 and 27 are emptied to the downstream gas C, and the fourth ballast 28 is equilibrated with the midstream gas B.

Figure 7B:
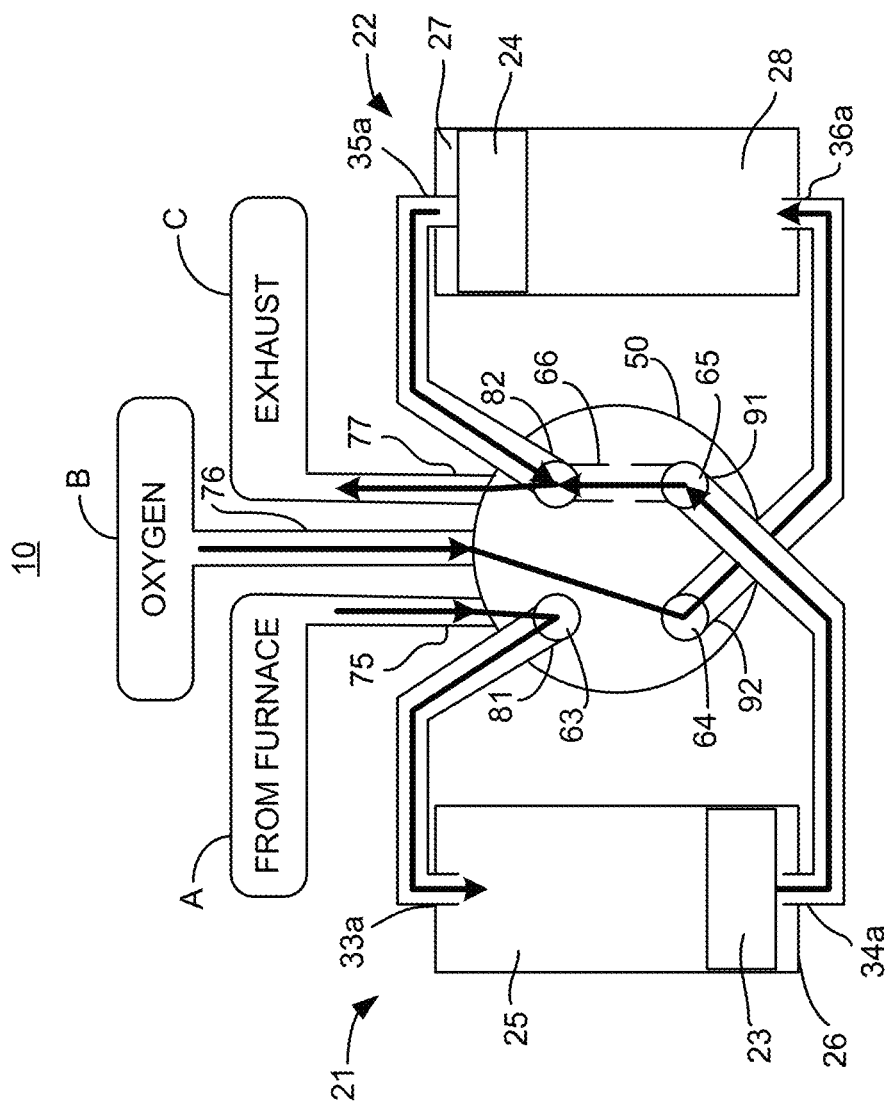

FIG. 7B shows the molar transfer device 10 when the first ballast 25 is fully filled with the upstream gas A, the second and third ballasts 26 and 27 are fully emptied to the downstream gas C, and the fourth ballast 28 is fully equilibrated with the midstream gas B.

During the fill cycle, the nozzles in the ballasts facilitate mixing as the ballast is filled, the piston speed may be adjusted by restriction of the exhaust such as by use of a proportional valve.

During the equilibrate cycle, the temperature and pressure inside the ballast is equilibrated. As noted above, the analyte fill pressure can vary due to disturbances. The midstream carrier gas pressure may be isolated from those disturbances and thus provide a constant pressure equilibration that is repeatable within 0.002 psi, 0.1 torr. The midstream carrier gas pressure will finish the piston movement if needed and limits dilution of the analyte. The equilibrate cycle also improves gas homogeneity.

The exhaust cycle empties the ballast into the downstream gas path where the exhaust path may be restricted to set the piston speed. As described below, the exhaust gas may be sampled by a doser for nitrogen measurements. A finish cycle finishes the pump stroke of the piston if necessary and keeps the ballast connected to the downstream path to ensure the ballast finishes being emptied.

Figure 7C:
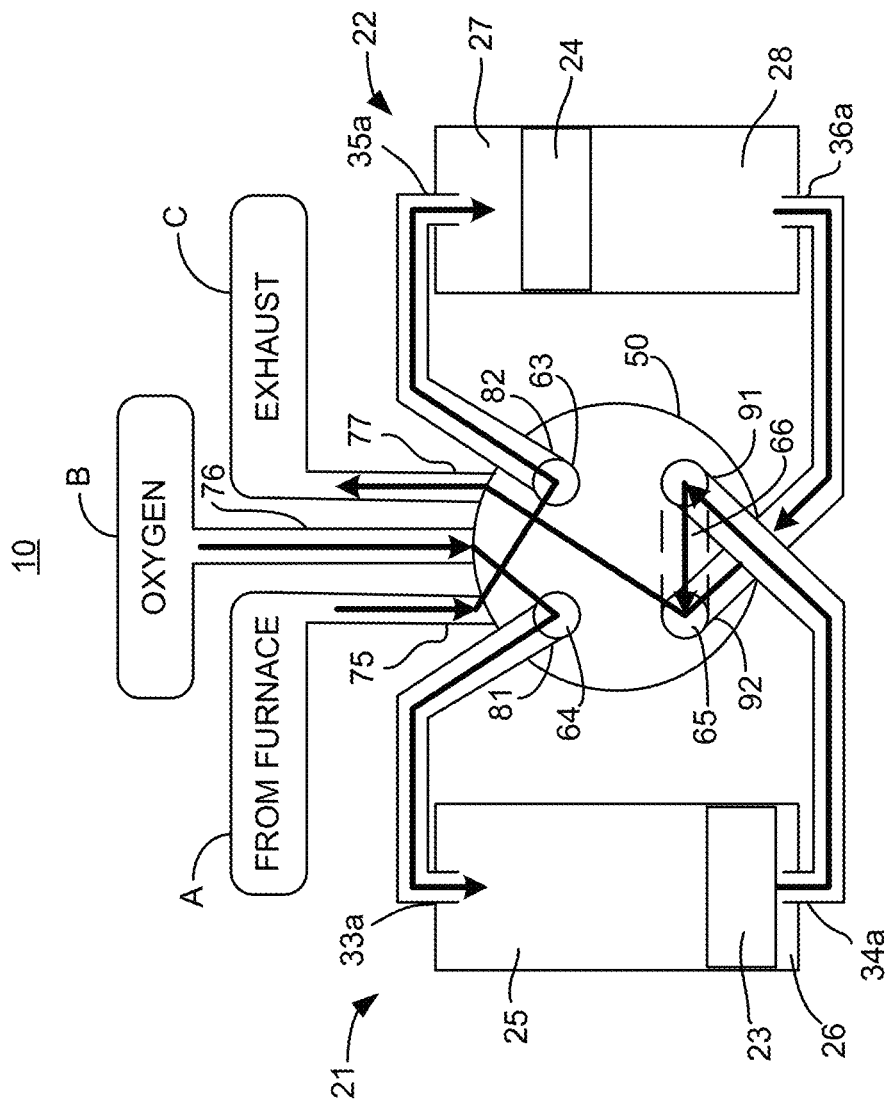

The motor 98 is activated to rotate the rotating chamber 50 by a quarter turn (or 90 degrees) as shown in FIG. 7C. The motor is activated at preset intervals of, for example, 3 seconds. The interval should be selected to allow adequate time for equilibration. In this state, the first axial port 63 is aligned with the second cap port 82 such that the upstream gas stream A from the furnace is directed into the third ballast 27 via the first radial port 75 of the valve body, the first axial port 63, the second cap port 82, and the third ballast port 35a. The second axial port 64 is aligned with the first cap port 81 such that the midstream gas B (such as oxygen) is directed into the first ballast 25 via the second radial port 76 of the valve body 70, the second axial port 64, the first cap port 81, and the first ballast port 33a. The third axial port 65 is aligned with the fourth cap port 92 such that gas is emptied from the fourth ballast 28 into the downstream gas stream (or exhaust) via the fourth ballast port 36a, the fourth cap port 92, the third axial port 65, and the third radial port 77 of the valve body 70. The pressure from the upstream gas filling the third ballast 27 presses the piston 24, which in turn pushes the gas from the fourth ballast 28. The third cap port 91 is aligned with the channel 66 such that gas is emptied from the second ballast 26 into the downstream gas stream (or exhaust) via second ballast port 34a, the third cap port 91, the channel 66, the third axial port 65, and the third radial port 77 of the valve body 70. The pressure from the midstream gas filling the first ballast 25 presses the piston 23, which in turn pushes any remaining gas from the second ballast 26. Thus, in this second state, the third ballast 27 is being filled with upstream gas A while the second and fourth ballasts 26 and 28 are emptied to the downstream gas C, and the first ballast 25 is equilibrated with the midstream gas B.

Figure 7D:
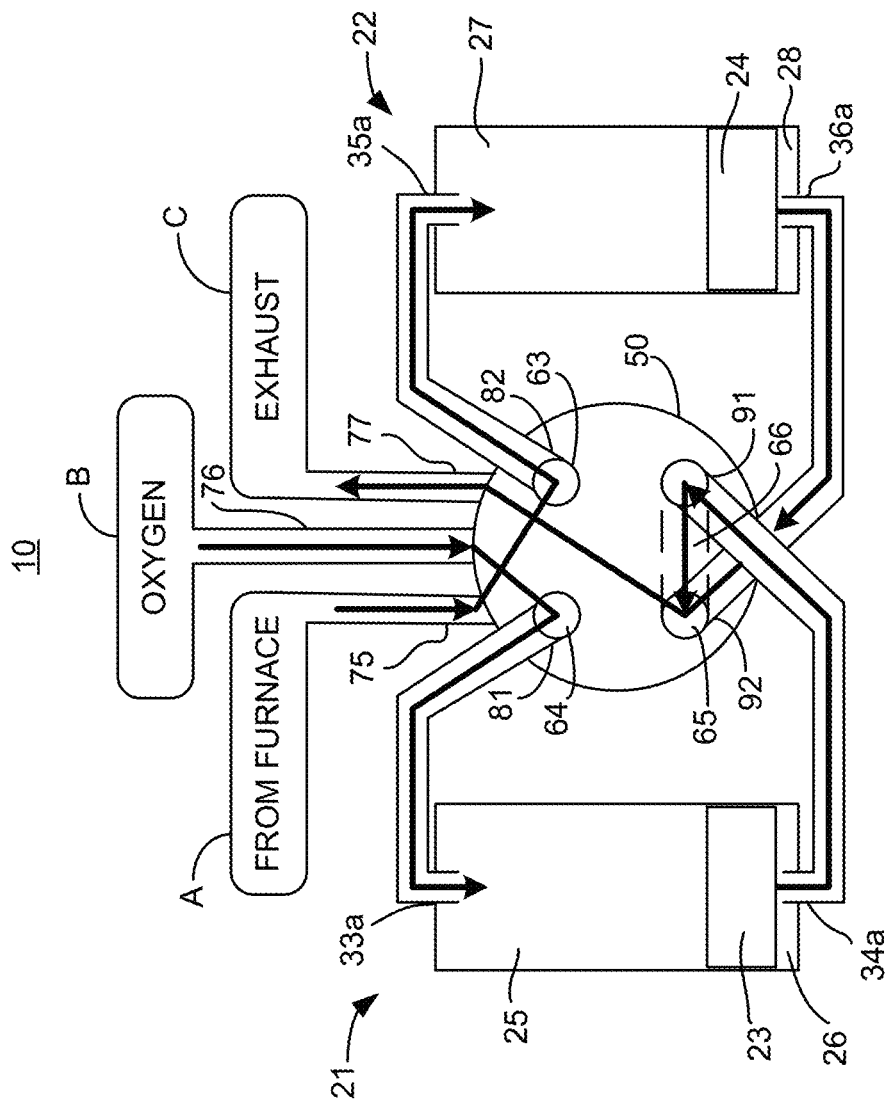

FIG. 7D shows the molar transfer device 10 when the first ballast 25 is fully equilibrated with the midstream gas B, the second and fourth ballasts 26 and 28 are fully emptied to the downstream gas C, and the third ballast 27 is fully filled with the upstream gas A.

Figure 7E:
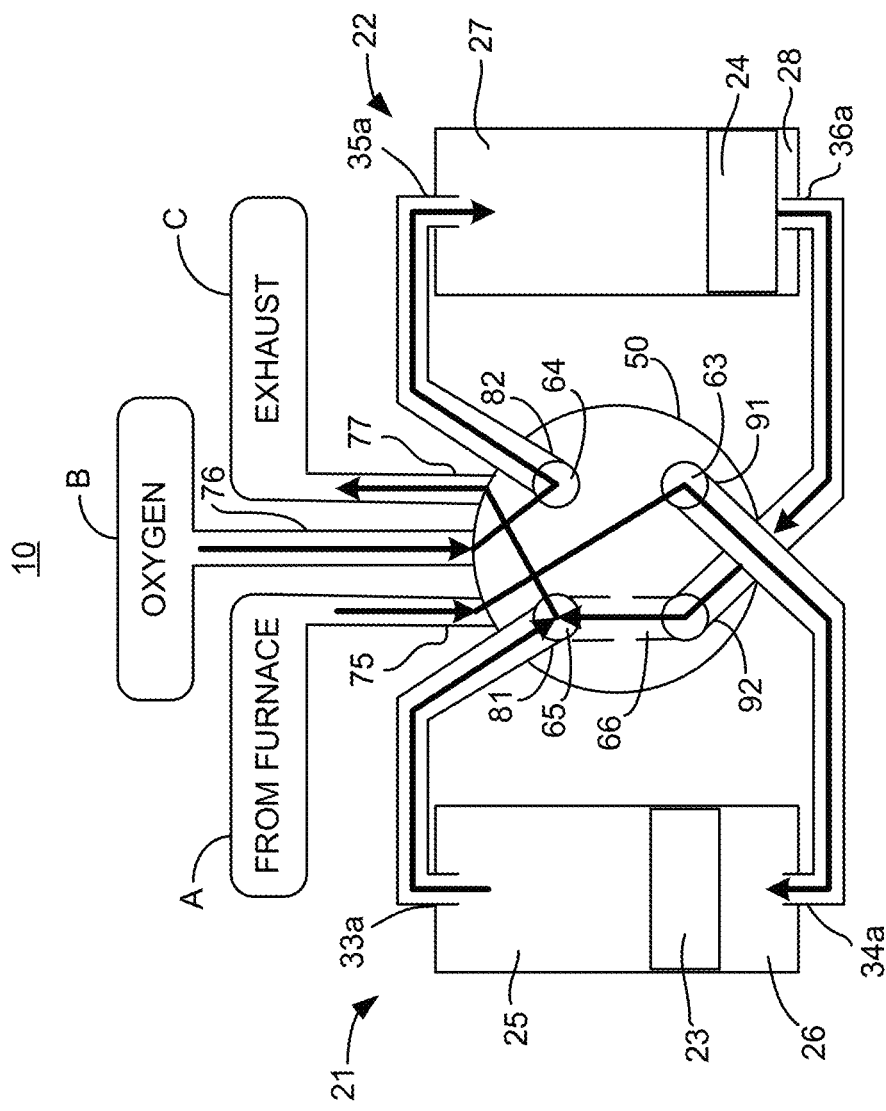

The motor 98 is then activated to rotate the rotating chamber 50 by 90 degrees as shown in FIG. 7E. In this state, the first axial port 63 is aligned with the third cap port 91 such that the upstream gas stream A from the furnace is directed into the second ballast 26 via the first radial port 75 of the valve body, the first axial port 63, the third cap port 91, and the second ballast port 34a. The second axial port 64 is aligned with the second cap port 82 such that the midstream gas B is directed into the third ballast 27 via the second radial port 76 of the valve body 70, the second axial port 64, the second cap port 82, and the third ballast port 35a. The third axial port 65 is aligned with the first cap port 81 such that gas is emptied from the first ballast 25 into the downstream gas stream (or exhaust) via the first ballast port 33a, the first cap port 81, the third axial port 65, and the third radial port 77 of the valve body 70. The pressure from the upstream gas filling the second ballast 26 presses the piston 23, which in turn pushes the gas from the first ballast 25. The fourth cap port 92 is aligned with the channel 66 such that gas is emptied from the fourth ballast 28 into the downstream gas stream via fourth ballast port 36a, the fourth cap port 92, the channel 66, the third axial port 65, and the third radial port 77 of the valve body 70. The pressure from the midstream gas filling the third ballast 27 presses the piston 24, which in turn pushes any remaining gas from the fourth ballast 28. Thus, in this third state, the second ballast 26 is being filled with upstream gas A while the first and fourth ballasts 25 and 28 are emptied to the downstream gas C, and the third ballast 27 is equilibrated with the midstream gas B.

Figure 7F:
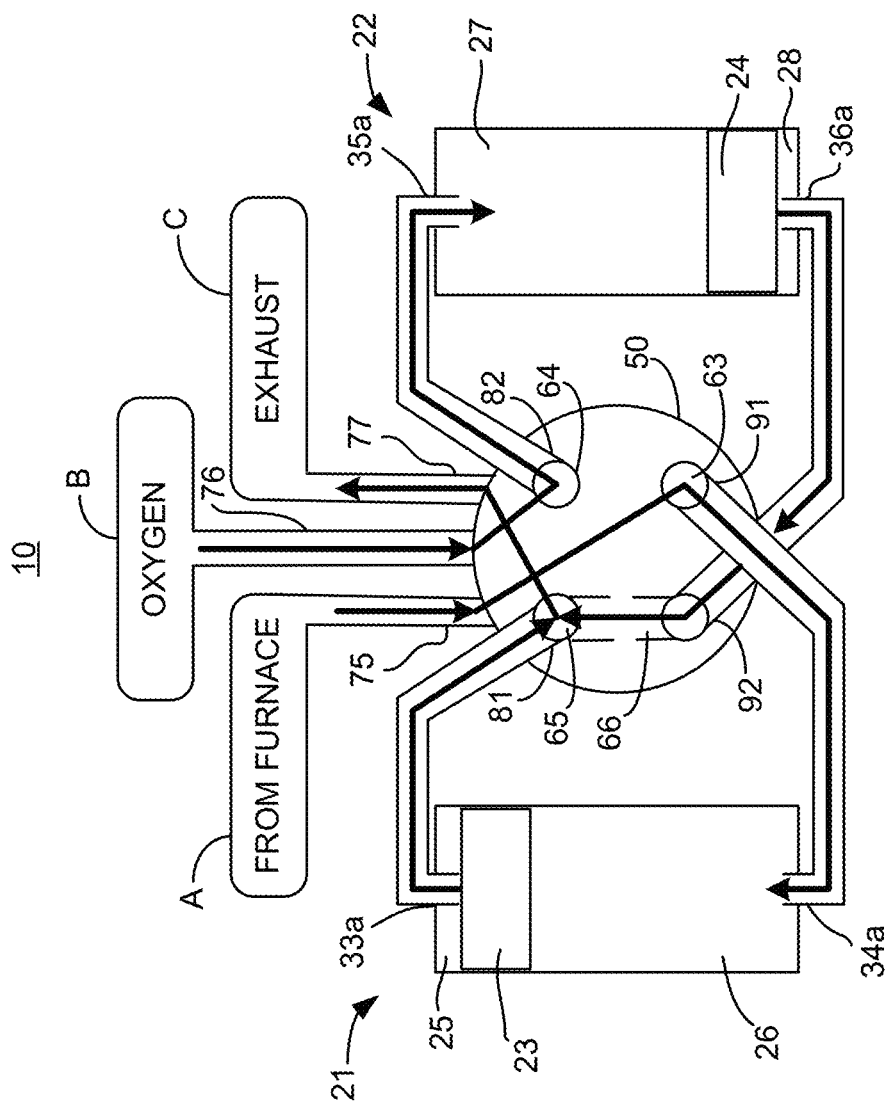

FIG. 7F shows the molar transfer device 10 when the third ballast 27 is fully equilibrated with the midstream gas B, the first and fourth ballasts 25 and 28 are fully emptied to the downstream gas C, and the second ballast 27 is fully filled with the upstream gas A.

Figure 7G:
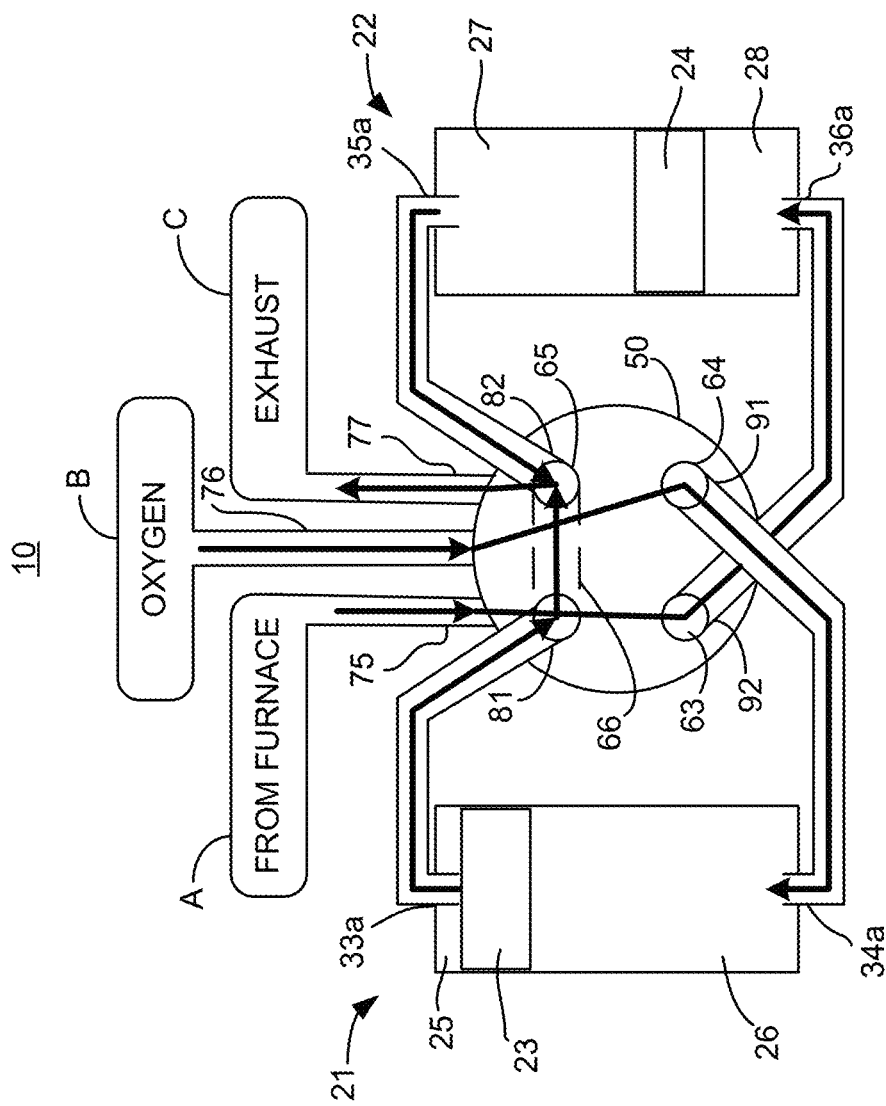

The motor 98 is again activated to rotate the rotating chamber 50 by 90 degrees as shown in FIG. 7G. In this state, the first axial port 63 is aligned with the fourth cap port 92 such that the upstream gas stream A from the furnace is directed into the fourth ballast 28 via the first radial port 75 of the valve body, the first axial port 63, the fourth cap port 92, and the fourth ballast port 36a. The second axial port 64 is aligned with the third cap port 91 such that the midstream gas B is directed into the second ballast 26 via the second radial port 76 of the valve body 70, the second axial port 64, the third cap port 91, and the second ballast port 34a. The third axial port 65 is aligned with the second cap port 82 such that gas is emptied from the third ballast 27 into the downstream gas stream (or exhaust) via the third ballast port 35a, the second cap port 82, the third axial port 65, and the third radial port 77 of the valve body 70. The pressure from the upstream gas filling the fourth ballast 28 presses the piston 24, which in turn pushes the gas from the third ballast 27. The first cap port 81 is aligned with the channel 66 such that gas is emptied from the first ballast 25 into the downstream gas stream via first ballast port 33a, the first cap port 81, the channel 66, the third axial port 65, and the third radial port 77 of the valve body 70. The pressure from the midstream gas filling the second ballast 26 presses the piston 23, which in turn pushes any remaining gas from the first ballast 25. Thus, in this fourth state, the fourth ballast 28 is being filled with upstream gas A while the first and third ballasts 25 and 27 are emptied to the downstream gas C, and the second ballast 26 is equilibrated with the midstream gas B.

Figure 7H:
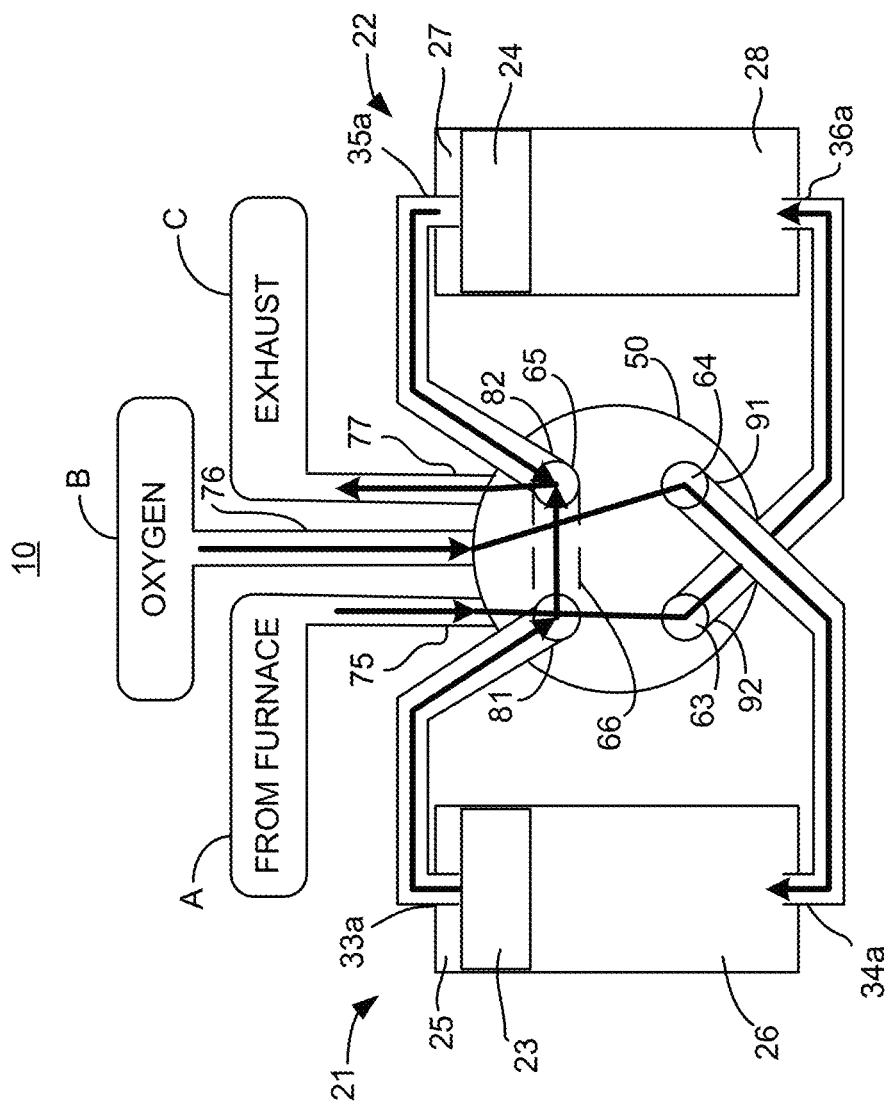

FIG. 7H shows the molar transfer device 10 when the second ballast 26 is fully equilibrated with the midstream gas B, the first and third ballasts 25 and 27 are fully emptied to the downstream gas C, and the fourth ballast 28 is fully filled with the upstream gas A.

The above process may then be repeated as many times as desired to transfer the full combustion gas from the furnace. The following is a state table of the four states described above.

|  | $1^{st}$ Ballast | $2^{nd}$ Ballast | $3^{rd}$ Ballast | $4^{th}$ Ballast |
| --- | --- | --- | --- | --- |
| State 1 | Fill | Finish | Empty | Equilibrate |
| State 2 | Equilibrate | Fill | Finish | Empty |
| State 3 | Empty | Equilibrate | Fill | Finish |
| State 4 | Finish | Empty | Equilibrate | Fill |
| State 5 | Fill | Finish | Empty | Equilibrate |
| State 6 | Equilibrate | Fill | Finish | Empty |

Note that States 1 and 5 are the same as are States 2 and 6. The six states are shown as they demonstrate a complete cycle whereby all four ballasts are filled, equilibrated, and then emptied and finished.

Because prior devices used larger ballasts on the order of 4.5 liters to collect all of the products of the combustion event, analysis of a protein may take anywhere from 2 minutes and 40 seconds to 3 minutes depending on the amount of overlap of analyzing different samples. Using the molar transfer device 10 described herein with its smaller ballasts, the analysis time will approach about 1 minute. By taking smaller samples using the ballasts 25, 26, 27, and 28, over-diluting is avoided and an improvement in signal-to-noise ratio of about 3:1 to 5:1 can be achieved. Further, the aliquot size can be reduced which saves reagents and can provide either better detection limits at the same cost per analysis as the prior art or the same detection limits at lower cost per analysis.

Combustion pressure can create different products. For example, at low pressure CO may be created instead of $CO_2$ or at high pressure more $SO_3$ may be created than $SO_2$. This is not desirable because $SO_3$ cannot be measured while $SO_2$ can resulting in the need to have to convert $SO_3$. Thus, the molar transfer device 10 has the advantage of providing a constant combustion pressure of about 2 psi instead of a non-constant pressure 0 to 8 psi as found in some prior art devices.

Description of an Alternative Rotary Valve

FIGS. 8-16 show an alternative design for a rotary valve 50'. Rotary valve 50' is similar to rotary valve 50 in function. The reference numerals used to describe rotary valve 50' are the same as for rotary valve 50 except for the prime (') used with each number. Structurally, rotary valve 50' differs in that all four of the cap ports 81', 82', 91', and 92' are provided in the first valve end cap 80' and the upstream gas port 75', the midstream gas port 76' and the downstream gas port 77' are all provided in the second valve end cap 90' rather than in a side of the valve body 70'. Additional differences will be apparent from the following description.

Rotary valve 50' includes a valve body 70' having a cylindrical bore 78' and a rotating cylindrical chamber 60' positioned in the cylindrical bore 78' so as to rotate therein. The rotating cylindrical chamber 60' having a first port 63', a second port 64', a third port 65', a fourth port 63a', in communication with the first port 63', a fifth port 64a' in communication with the second port 64', and a sixth port 65a' in communication with the third port 65'. The rotating cylindrical chamber 60' having a first end 61' and a second end 62' at opposite ends of the cylinder. The first, second and third ports 63', 64', 65' opening at the first end 61' and the fourth, fifth and sixth ports 63a', 64a', 65a' opening at the second end 62'. The second end 62' having a first annular groove 101 in communication with the sixth port 65a' and one of an upstream gas port 75', a midstream gas port 76', and a downstream gas port 77' regardless of the rotated position of the rotating cylindrical chamber 60'. In the example shown, the first annular groove 101 is in communication with the sixth port 65*a'* and the downstream gas port 77'. The second end 62' further comprises a second annular groove 102 in communication with the fifth port 64*a'* and another one of the upstream gas port 75', the midstream gas port 76', and the downstream gas port 77' regardless of the rotated position of the rotating cylindrical chamber 60'. In the example shown, the second annular groove 102 is in communication with the fifth port 64*a'* and the midstream gas port 76'. The fourth port 63*a'* opens in a center of the second end 62' and is in communication with yet another one of the upstream gas port 75', the midstream gas port 76', and the downstream gas port 77'. In the example shown, the second annular groove 102 is in communication with the fourth port 63*a'* and the upstream gas port 75'.

The rotary valve 50' further comprises a first valve end cap 80' including a first cap port 81' extending internally to align with one of the first port 63', the second port 64', and the third port 65' depending on the rotational position of the rotating cylindrical chamber 60', and a second cap port 82' extending internally to align with another one of the first port 63', the second port 64', and the third port 65' depending on the rotational position of the rotating cylindrical chamber 60'. Optionally, the first valve end cap 80' may further include a third cap port 91' extending internally to align with one of the first port 63', the second port 64', and the third port 65' depending on the rotational position of the rotating cylindrical chamber 60', and a fourth cap port 92' extending internally to align with another one of the first port 63', the second port 64', and the third port 65' depending on the rotational position of the rotating cylindrical chamber 60'.

Unlike the rotary valve 50, the rotary valve 50' does not include channels 66 and 67, which were provided to allow the pistons 23 and 24 to complete their travel during the equilibration state, if necessary. However, it has been found that the pistons 23 and 24 complete their travel during the equilibration state thereby not needing this fourth ("finish") state whereby the ballast opposite the ballast undergoing equilibration is connected to the downstream port 77'.

The rotary valve 50' further comprises a motor (not shown but similar to motor 98) for rotating the rotating cylindrical chamber 60' to different rotational positions in order to alter which of the first port 63', the second port 64', and the third port 65' is aligned with the first cap port 81' and the second cap port 82' (and optionally the second cap port 91' and the fourth cap port 92') such that each of the cap ports is sequentially connected to the upstream gas port 75', the midstream gas port 76', and the downstream gas port 77'.

The motor 98 is secured to one of the valve end caps 80', 90'. As shown in the example in FIGS. 8-16, there is a hole 69*b'* (FIG. 16) in the first valve end cap 80' that aligns with a hole 69*a'* in the first end seal 85' for the motor shaft to pass through and engage the non-circular port 69' in the center of the rotating chamber 60'.

Figure 16:
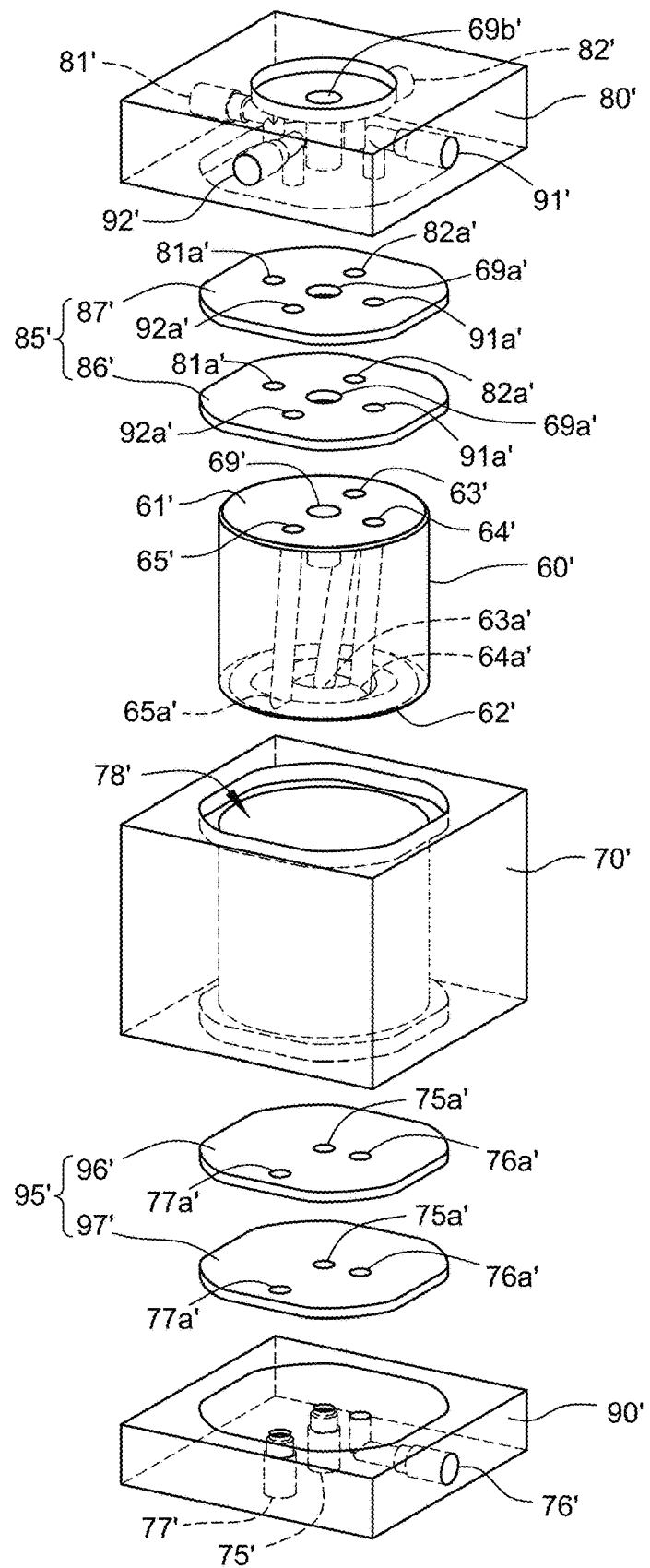
FIG. 16 is an exploded perspective view of the rotary valve shown in FIG. 8.

As shown also in FIG. 16, the first and second end seals 85' and 95' between the first and second valve end caps 80' and 90' and the rotating chamber end faces 61' and 62' are preferably composed of two materials: an elastomer material 87' and 97' that is in contact with the valve end cap 80' and 90'; and a low friction-material 86' and 96' such as PTFE that is in contact with the rotational chamber end face 61' and 62'. The elastomer material 87' and 97' provides a spring force to keep the low-friction material 86' and 96' sealing against the chamber end face 61' and 62'. The end seals 85' and 95' are retained between the valve end cap 80' and 90' and the valve body 70' so that they do not rotate with the chamber 60'.

Openings 81*a'*, 82*a'*, 91*a'*, 92*a'* (FIG. 16) in the end seal 85' match each cap port 81', 82', 91', 92', respectively. Openings 75*a'*, 76*a'*, 77*a'* (FIG. 16) in the end seal 95' match each of upstream gas port 75', midstream gas port 76', and downstream gas port 77', respectively.

Description of the First Application

Figure 17:
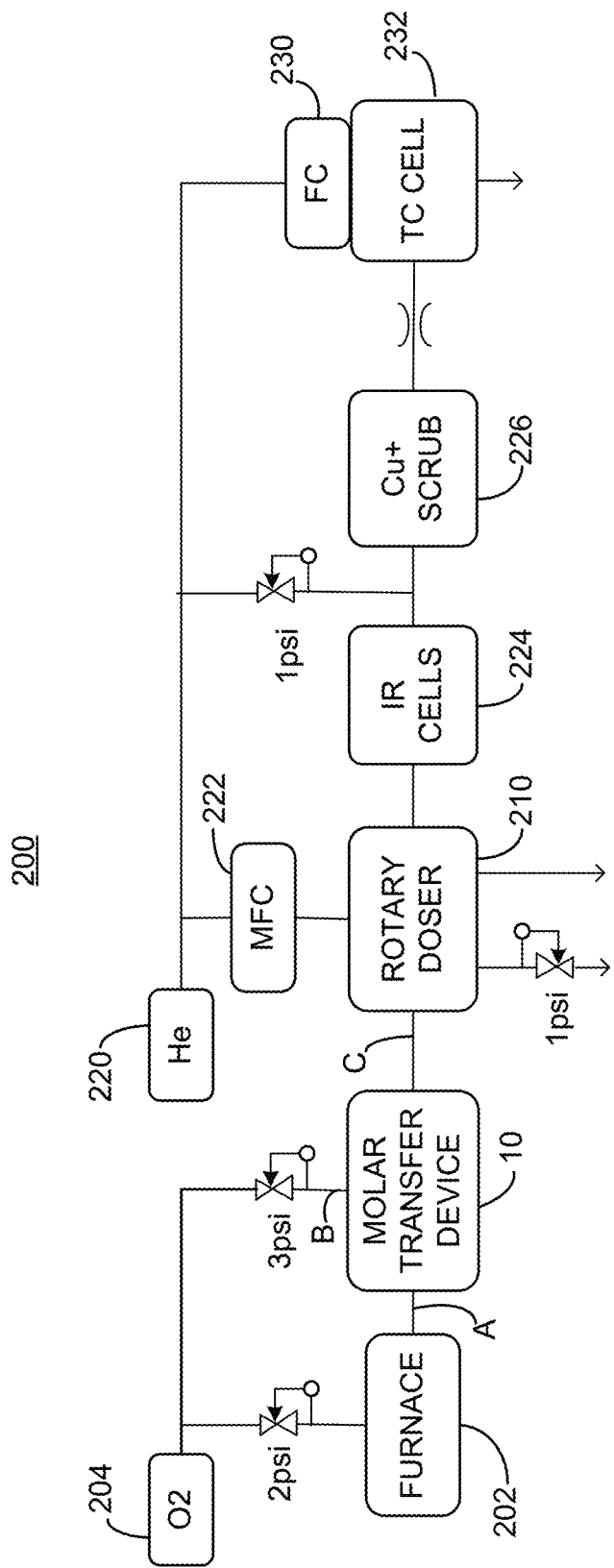
FIG. 17 is a block diagram of an elemental analyzer using the molar transfer device shown in FIG. 1.

The first application of the molar transfer device 10 is in a combustion analyzer 200 as shown in FIG. 17. The molar transfer device is connected to a combustion furnace 202 to receive the upstream gas A therefrom, and is connected to a pressurized oxygen carrier gas to receive the midstream gas B. The upstream combustion pressure may be set to produce the desired gas constituents during combustion, which for some analyzers is approximately 2 psi. The midstream pressure may be set to 3 psi; sufficiently higher than the expected maximum upstream pressure during sample combustion. The downstream path C exhausts through a proportional valve (not shown) and a doser 210 to atmospheric pressure. The proportional valve and motor 98 timing may be adjusted to achieve the desired flow rate.

The doser 210 is preferably a rotary doser such as that disclosed in U.S. patent application Ser. No. 17/335,540, filed on Jun. 1, 2021, by Peter Willis et al. and entitled "ROTARY DOSING DEVICE," the entire disclosure of which is incorporated herein by reference. The rotary doser 210 is advantageous in that it allows a user to select the aliquot size in small increments without loss of precision. Prior dosers used 3 and 10 cc aliquot loops so the user could only select one of these two dosages. The rotary doser 210 receives a carrier gas such as He from an He source 220 via a mass flow controller 222 and supplies the aliquot to scrubbers/detectors such as IR cells 224, Cu+ scrubber 226, and a thermal conductivity (TC) cell 232, which may receive He through a flow controller 230. The scrubbers/detectors are generally known in the art.

In operation, if the rotary valve 50 is used, the motor 98 aligns the ports 63, 64, and 65 and channel 66 with the cap ports 81, 82, 91, and 92 and will repeatedly rotate the chamber 60 to the four 90° positions to cycle ballasts 25, 26, 27, and 28 through their four states as described above. If the alternate rotary valve 50' is used, the motor 98 aligns the ports 63', 64', and 65' with the cap ports 81', 82', 91', and 92' and will repeatedly rotate the chamber 60' to the four 90° positions to cycle ballasts 25, 26, 27, and 28 through their four states as described above.

Figure 18:
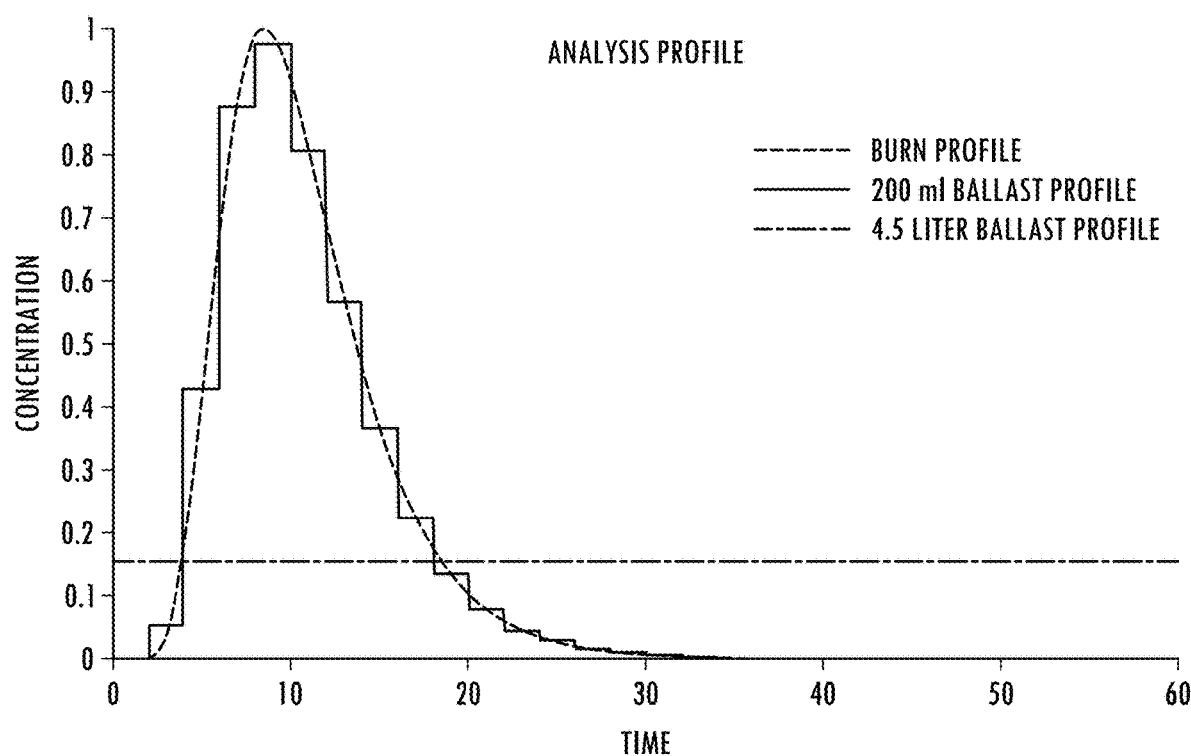
FIG. 18 is graph showing sample analysis over time for a device using one large 4.5 liter ballast and a device having 200 ml ballasts.

By providing the molar transfer device 10 in the combustion analyzer 200, the user can select the sensitivity of the analyzer. FIG. 18 shows comparative graphs of the analysis of a sample taken using a single 4.5 liter ballast versus that taken using the molar transfer device 10 having 200 ml ballasts 25, 26, 27, and 28. As readily apparent, the larger ballast effectively averages the analyte over the time it takes to fill and equilibrate the ballast volume whereas the smaller ballasts take many separate samples over that time to show the extent to which the analyte compositions changes over that time.

Another advantage the combustion analyzer 200 has over prior art combustion analyzers is that it may use low purity $O_2$ instead of high purity $O_2$, which is used in prior art analyzers to reduce peaks in blanks that are otherwise caused when using lower purity $O_2$. The lower purity $O_2$ includes contaminants such as Argon, which is hard to scrub and produces larger peaks in blanks. Thus, higher purity $O_2$ was used to reduce the presence of Argon. In the present system, however, the baseline shifts up, so there are no blanks. This allows the use of low purity $O_2$, which provides cost savings. Furthermore, high purity $O_2$ is not readily available in some countries.

Because the molar transfer device 10 does not dilute samples with as much $O_2$ as prior devices, the Cu+ scrubber may be eliminated or otherwise use less Cu since there is less $O_2$ to remove. As noted above, the analysis time may be faster by as much as 0.5 to 1.5 minutes. The instrument cost may be lowered as may the cost of maintenance.

Description of the Second Application

In a second application the device 10 is located downstream in a fusion analyzer, or in the secondary inert stream of a combustion analyzer. In this application, the molar transfer device 10 is designed to handle flow rates of helium or argon at approximately 350 ml/min. The device 10 has all of the features of the first application except that in these applications, it is desirable to precisely control the piston speed since the downstream path flows directly into a gas detector. The pistons 23 and 24 can be controlled by various means, but preferably by a non-contact magnetic drive. A magnet is imbedded in the pistons 23 and 24 and driven either by a complementary magnet mounted on an external mechanical actuator, or by external stationary electrical windings that can be energized in such as manner as to move the piston magnet in either direction at a constant speed.

The smaller ballast volume is expected to have an equilibration time of less than 2 seconds. The ballast is therefore designed to fill in approximately 2 seconds, yielding a ballast volume of $$350 \frac{\text{mL}}{\text{min}} * \frac{2 \text{ sec}}{60} = 11.7 \text{ mL}$$

These applications have traditionally been served by mass flow controllers or mechanical flow controllers. However, when the gas composition changes, these traditional flow controllers alter their flow rates and distort signals at the detector. The molar transfer device 10 used in these applications does not alter its flow rate so the signals are not distorted at the detector.

It will become apparent to those skilled in the art that, given the teaching of this specification, multiple bidirectional or unidirectional ballasts may be employed to achieve the improved performance of an analyzer. It will also be apparent to those skilled in the art that these and other modifications can be made without departing from the spirit or scope of the invention as defined by the appended claims.

The invention claimed is:

1. A molar transfer device comprising:
   a ballast mechanism comprising:
      a first ballast cylinder,
      a passive piston provided in the first ballast cylinder that divides the first ballast cylinder into a first ballast chamber and a second ballast chamber,
      a first ballast port for allowing gas to flow into and out of the first ballast chamber, and
      a second ballast port for allowing gas to flow into and out of the second ballast chamber; and
   a valve device comprising:
      a valve body including an upstream gas port, a midstream gas port, and a downstream gas port, and
      a valve contained in the valve body coupled to the first ballast port and the second ballast port for sequentially: (a) directing gas from the upstream gas port into the first ballast chamber while emptying the second ballast chamber into the downstream gas port, (b) coupling the first ballast port to the midstream gas port to equilibrate the gas in the first ballast chamber, (c) directing gas from the upstream gas port into the second ballast chamber while emptying the first ballast chamber into the downstream gas port, and (d) coupling the second ballast port to the midstream gas port to equilibrate the gas in the second ballast chamber.

2. The molar transfer device of claim 1, wherein the ballast mechanism further comprises:
   a second ballast cylinder;
   a second passive piston provided in the second ballast cylinder that divides the second ballast cylinder into a third ballast chamber and a fourth ballast chamber;
   a third ballast port for allowing gas to flow into and out of the third ballast chamber; and
   a fourth ballast port for allowing gas to flow into and out of the fourth ballast chamber,
   wherein the valve is further coupled to the third ballast port and the fourth ballast port.

3. The molar transfer device of claim 2, wherein the valve is further configured for sequentially: (a) directing gas from the upstream gas port into the third ballast chamber while emptying the fourth ballast chamber into the downstream gas port, (b) coupling the third ballast port to the midstream gas port to equilibrate the gas in the third ballast chamber, (c) directing gas from the upstream gas port into the fourth ballast chamber while emptying the third ballast chamber into the downstream gas port, and (d) coupling the fourth ballast port to the midstream gas port to equilibrate the gas in the fourth ballast chamber.

4. The molar transfer device of claim 1, wherein the valve of the valve device is a rotary valve, wherein the valve body includes a cylindrical bore in communication with the upstream gas port, the midstream gas port, and the downstream gas port, and wherein the rotary valve comprises:
   a rotating cylindrical chamber positioned in the cylindrical bore so as to rotate therein, the rotating cylindrical chamber having a first axial port, a second axial port, a third axial port, a first radial port in communication with the first axial port, a second radial port in communication with the second axial port, and a third radial port in communication with the third axial port, an outer cylindrical wall of the rotating chamber being spaced from the inner wall of the cylindrical bore to allow the first radial port, the second radial port, and the third radial port to be in communication with the upstream gas port, the midstream gas port, and the downstream gas port, respectively, regardless of the rotated position of the rotating cylindrical chamber;
   a first valve end cap including a first cap port connected to the first ballast port and extending internally to align with one of the first axial port, the second axial port, and the third axial port depending on the rotational position of the rotating cylindrical chamber, and a second cap port connected to the second ballast port and extending internally to align with another one of the first axial port, the second axial port, and the third axial port depending on the rotational position of the rotating cylindrical chamber; and
   a motor for rotating the rotating cylindrical chamber to different rotational positions in order to alter which of the first axial port, the second axial port, and the third axial port is aligned with the first cap port and the second cap port such that each of the first and second ballast chambers is sequentially filled with gas from the upstream gas stream, equilibrated with the midstream gas stream, and emptied into the downstream gas stream, wherein as the first ballast chamber is filled, the second ballast chamber is emptied and as the second ballast chamber is filled, the first ballast chamber is emptied.

5. The molar transfer device of claim 4, wherein, wherein the ballast mechanism further comprises:

a second ballast cylinder;

a second passive piston provided in the second ballast cylinder that divides the second ballast cylinder into a third ballast and a fourth ballast;

a third ballast port for allowing gas to flow into and out of the second ballast; and a fourth ballast port for allowing gas to flow into and out of the fourth ballast;

wherein the rotary valve further comprises a second valve end cap including a third cap port connected to the third ballast port and extending internally to align with one of the first axial port, the second axial port, and the third axial port depending on the rotational position of the rotating cylindrical chamber, and a fourth cap port connected to the fourth ballast port and extending internally to align with another one of the first axial port, the second axial port, and the third axial port depending on the rotational position of the rotating cylindrical chamber, wherein the motor rotates the rotating cylindrical chamber to four different rotational positions in order to alter which of the first axial port, the second axial port, and the third axial port is aligned with the first cap port, the second cap port, the third cap port, and the fourth cap port such that each of the first, second, third, and fourth ballast chambers is sequentially filled with gas from the upstream gas stream, equilibrated with the midstream gas stream, and emptied into the downstream gas stream, wherein as the third ballast chamber is filled, the fourth ballast chamber is emptied and as the fourth ballast chamber is filled, the third ballast chamber is emptied.

6. The molar transfer device of claim 1, wherein the valve of the valve device is a rotary valve, wherein the valve body includes a cylindrical bore in communication with the upstream gas port, the midstream gas port, and the downstream gas port, and wherein the rotary valve comprises:

a rotating cylindrical chamber positioned in the cylindrical bore so as to rotate therein, the rotating cylindrical chamber having a first port, a second port, a third port, a fourth port in communication with the first port, a fifth port in communication with the second port, and a sixth port in communication with the third port, the rotating cylindrical chamber having a first end and a second end at the opposite end of the rotating cylindrical chamber, the first, second and third ports opening at the first end and the fourth, fifth and sixth ports opening at the second end, the second end having a first annular groove in communication with the fourth port and one of the upstream gas port, the midstream gas port, and the downstream gas port regardless of the rotated position of the rotating cylindrical chamber, the second end further comprising a second annular groove in communication with the fifth port and another one of the upstream gas port, the midstream gas port, and the downstream gas port regardless of the rotated position of the rotating cylindrical chamber, the sixth port opens in a center of the second end and is in communication with yet another one of the upstream gas port, the midstream gas port, and the downstream gas port;

a first valve end cap including a first cap port extending internally to align with one of the first port, the second port, and the third port depending on the rotational position of the rotating cylindrical chamber, and a second cap port extending internally to align with another one of the first port, the second port, and the third port depending on the rotational position of the rotating cylindrical chamber, wherein the first cap port is connected to the first ballast port and the second cap port is connected to the second ballast port; and a motor for rotating the rotating cylindrical chamber to different rotational positions in order to alter which of the first port, the second port, and the third port is aligned with the first cap port and the second cap port such that each of the first cap port and the second cap port is sequentially connected to the upstream gas port, the midstream gas port, and the downstream gas port whereby each of the first and second ballast chambers is sequentially filled with gas from the upstream gas stream, equilibrated with the midstream gas stream, and emptied into the downstream gas stream, wherein as the first ballast chamber is filled, the second ballast chamber is emptied and as the second ballast chamber is filled, the first ballast chamber is emptied.

* * * * *